(12) United States Patent
Massard et al.

(10) Patent No.: US 12,007,660 B2
(45) Date of Patent: Jun. 11, 2024

(54) LIGHT MODULATOR, SUBSTRATE COMPRISING ELECTRODES AND SMART GLAZING

(71) Applicant: eLstar Dynamics Patents B.V., Rockanje (NL)

(72) Inventors: Romaric Mathieu Massard, Eindhoven (NL); Anthony John Slack, Lorgues (FR)

(73) Assignee: ELSTAR DYNAMICS PATENTS B.V., Rockanje (NL)

( * ) Notice: Subject to any disclaimer, the term of this patent is extended or adjusted under 35 U.S.C. 154(b) by 479 days.

(21) Appl. No.: 17/356,962

(22) Filed: Jun. 24, 2021

(65) Prior Publication Data
US 2022/0413352 A1    Dec. 29, 2022

(51) Int. Cl.
*G02F 1/167* (2019.01)
*G02F 1/1675* (2019.01)
(Continued)

(52) U.S. Cl.
CPC ............ *G02F 1/167* (2013.01); *G02F 1/1675* (2019.01); *G02F 1/16755* (2019.01);
(Continued)

(58) Field of Classification Search
CPC .. G02B 6/0028; G02B 6/0065; G02B 6/0068; G02B 6/0076; G02B 6/0036; G02B 6/0051; G02B 6/0055; G02B 6/0056; G02B 6/0061; G02B 6/0086; G02B 26/005; G02B 27/0101; G02B 6/0018; G02B 6/002; G02B 6/003; G02B 6/005; G02B 6/0053; G02B 6/006; G02B 6/0088; G02F 1/167; G02F 1/133524; G02F 1/16755; G02F 1/1676; G02F 1/1681; G02F 1/1685; G02F 2201/50; G02F 2202/10; G02F 1/0107; G02F 1/13306; G02F 1/133354; G02F 1/133377; G02F 1/1334; G02F 1/13345;
(Continued)

(56) References Cited

U.S. PATENT DOCUMENTS 4,680,103 A    7/1987  Beilin et al.
5,161,048 A   11/1992  Rukavina
(Continued)

FOREIGN PATENT DOCUMENTS

CN    112 162 419 A    1/2021
CN    113 655 557 A   11/2021
(Continued)

OTHER PUBLICATIONS

Final Office Action from U.S. Appl. No. 17/087,063, dated Jun. 1, 2023, pp. 1-26.
(Continued)

*Primary Examiner* — Brandi N Thomas
(74) *Attorney, Agent, or Firm* — Crowell & Moring LLP

(57) ABSTRACT

Some embodiments are directed to a light modulator comprising transparent or reflective substrates, multiple electrodes being applied to the substrates in a pattern across the substrate. A controller may apply an electric potential to the electrodes to obtain an electro-magnetic field between the electrodes providing electrophoretic movement of the particles towards or from an electrode.

33 Claims, 28 Drawing Sheets

(51) Int. Cl.
*G02F 1/16755* (2019.01)
*G02F 1/16756* (2019.01)
*G02F 1/1676* (2019.01)
*G02F 1/1685* (2019.01)
*G09F 9/37* (2006.01)

(52) U.S. Cl.
CPC ........ *G02F 1/16756* (2019.01); *G02F 1/1676* (2019.01); *G02F 1/1685* (2019.01); *G09F 9/37* (2013.01); *G09F 9/375* (2013.01); *G02F 2201/50* (2013.01); *G02F 2202/10* (2013.01)

(58) Field of Classification Search
CPC ............. G02F 1/133616; G02F 1/1341; G02F 1/134309; G02F 1/13439; G02F 1/1675; G02F 1/16756; G02F 1/16757; G02F 1/1677; G02F 2001/1678; G02F 2201/12; G02F 2201/122; G02F 2201/124; G02F 2203/48
See application file for complete search history.

(56) References Cited

U.S. PATENT DOCUMENTS

| | | |
|---|---|---|
| 6,618,109 B2 | 9/2003 | Hidehira et al. |
| 6,631,022 B1 | 10/2003 | Kihira |
| 7,177,002 B2 | 2/2007 | Matsumoto et al. |
| 7,362,400 B2 | 4/2008 | Itou et al. |
| 8,018,430 B2 | 9/2011 | Choi et al. |
| 8,054,535 B2 | 11/2011 | Sikharulidze et al. |
| 8,384,659 B2 | 2/2013 | Yeo et al. |
| 8,446,663 B2 | 5/2013 | Kim et al. |
| 8,514,481 B2 | 8/2013 | Yeo et al. |
| 8,520,286 B2 | 8/2013 | Clapp et al. |
| 9,013,780 B2 | 4/2015 | Henzen et al. |
| 9,075,281 B2 | 7/2015 | Kato et al. |
| 9,176,347 B2 | 11/2015 | Peng et al. |
| 9,201,282 B2 | 12/2015 | Henzen |
| 10,921,678 B2 | 2/2021 | van de Kamer |
| 11,099,451 B1 | 8/2021 | Massard |
| 2003/0166019 A1 | 9/2003 | Wiltfang et al. |
| 2004/0145696 A1 | 7/2004 | Que et al. |
| 2005/0185104 A1 | 8/2005 | Weisbuch et al. |
| 2005/0213191 A1 | 9/2005 | Whiteside |
| 2007/0046621 A1 | 3/2007 | Suwabe et al. |
| 2007/0291808 A1 | 12/2007 | Ledentsov |
| 2009/0040192 A1 | 2/2009 | Haga |
| 2009/0321265 A1 | 12/2009 | Stancovski |
| 2010/0321346 A1 | 12/2010 | Chae et al. |
| 2011/0290649 A1 | 1/2011 | Hamada |
| 2011/0249933 A1 | 10/2011 | Nair |
| 2011/0261432 A1* | 10/2011 | Yamazaki ............. G02F 1/1677 359/296 |
| 2011/0304529 A1 | 12/2011 | Yeo et al. |
| 2012/0087389 A1 | 4/2012 | Howe |
| 2012/0090976 A1 | 4/2012 | Kobayashi et al. |
| 2013/0016420 A1 | 1/2013 | Yeo et al. |
| 2014/0061049 A1 | 3/2014 | Lo |
| 2014/0104155 A1 | 4/2014 | Long |
| 2014/0160412 A1 | 6/2014 | Peng et al. |
| 2015/0268593 A1 | 9/2015 | Sasaki et al. |
| 2016/0004368 A1 | 1/2016 | Kurasawa |
| 2016/0071465 A1 | 3/2016 | Hung et al. |
| 2016/0187755 A1 | 6/2016 | Kasegawa |
| 2017/0061895 A1 | 3/2017 | Paolini, Jr. et al. |
| 2018/0116712 A1 | 5/2018 | Dong et al. |
| 2018/0239211 A1 | 8/2018 | Teranishi et al. |
| 2018/0247598 A1 | 8/2018 | Sainis |
| 2019/0302564 A1 | 10/2019 | van de Kamer |
| 2019/0324343 A1 | 10/2019 | Atkinson et al. |
| 2020/0066924 A1 | 2/2020 | Tombs et al. |
| 2020/0320921 A1 | 10/2020 | Lin et al. |
| 2021/0055621 A1 | 2/2021 | Massard |
| 2021/0181594 A1 | 6/2021 | Jain et al. |

FOREIGN PATENT DOCUMENTS

| | | |
|---|---|---|
| FR | 2842916 A1 | 1/2004 |
| JP | S49 29995 A | 3/1974 |
| KR | 101 067 174 B1 | 9/2011 |
| KR | 20140099421 | 8/2014 |
| WO | WO 03/100758 A1 | 12/2003 |
| WO | WO 2008/012934 A1 | 1/2008 |
| WO | WO 2011/012499 A1 | 2/2011 |
| WO | WO 2014/209119 A2 | 12/2014 |
| WO | WO 2017/026480 A1 | 2/2017 |
| WO | WO 2018/204582 A1 | 11/2018 |
| WO | WO 2021/138344 A1 | 7/2021 |
| WO | WO 2021/228907 A1 | 11/2021 |

OTHER PUBLICATIONS

C. Qiu et al., "Transparent Ferroelectric Crystals with Ultrahigh Piezoelectricity," *Nature*, 577 (2020) pp. 350-367.
Notice of Reasons for Refusal and English translation from JP2021-545949, dated Sep. 12, 2023, pp. 1-11.
Non-Final Office Action, issued in U.S. Appl. No. 17/087,063, dated Sep. 14, 2022, pp. 1-31, U.S. Patent and Trademark Office, Alexandria, VA.
Office Action from U.S. Appl. No. 17/383,831, dated Oct. 3, 2022, pp. 1-24.
International Search Report and Written Opinion from International Application No. PCT/EP2022/056315, dated Jun. 7, 2022, 15 pp.
International Search Report and Written Opinion from International Application No. PCT/E P2023/065535, dated Sep. 1, 2023, 15 pp.
International Search Report and Written Opinion from International Application No. PCT/EP2022/080773, dated May 11, 2023, 30 pp.
Extended European Search Report from European Application No. 22215020.3-1207, dated May 30, 2023, 9 pp.
Aieta et al. "Supplementary Materials for Multiwavelength Achromatic Metasurfaces by Dispersive Phase Compensation," Science, vol. 347, No. 6228, (2015) pp. 1342-1345.
Abdelraouf et al. "Recent Advances in Tunable Metasurfaces: Materials, Design and Applications," ACS Nano, vol. 16, No. 9 (2022) pp. 13339-13369.
Turing, "The Chemical Basis of Morphogenesis," Philosophical Transactions of the Royal Society of London. Series B, Biological Sciences, vol. 237, No. 641 (1952), pp. 37-72.
Murray et al. "Numerical comparison of grid pattern diffraction effects through measurement and modeling with OptiScan software," Proc. of SPIE, vol. 8016 (2011) pp. 1-15.
Nockert, "AI for Game Programming 2: Maze Generation (A3.6)," (Jan. 8, 2020) pp. 1-12.
Yonghe et al. "A Simple Sweep-line Delaunay Triangulation Algorithm," Journal of Algorithms and Optimization, vol. 1, Iss. 1 (2013) pp. 30-38.
Skyum, "A Sweepline Algorithm for Generalized, Delaunay Triangulations," DAIMI Report Series, vol. 20, issue 373 (1991) pp. 1-21.
Tao et al. "Reversible Metal Electrodeposition Devices: An Emerging Approach to Effective Light Modulation and Thermal Management," Adv. Optical Mater. vol. 9 (2021) pp. 2001847-1 to 2001847-15.
Hu et al. "Efficient full-path optical calculation of scalar and vector diffraction using the Bluestein method," Light: Science & Applications, vol. 9, issue 119 (2020) pp. 1-11.
Leutenegger et al. "Fast focus field calculations," Optics Express, vol. 14, No. 23 (2006), pp. 11277-11290.
California et al. "Silver grid electrodes for faster switching ITO free electrochromic devices," Solar Energy Materials & Solar Cells, vol. 153 (2016), pp. 61-67.
Kim et al. "Non-uniform sampling and wide range angular spectrum method," J. Opt. vol. 16 (2014) pp. 125710-1 to 125710-9.
Li et al. "Large-area metasurface on CMOS-compatible fabrication platform: driving flat optics from lab to fab," Nanophotonics, vol. 9, issue 10 (2020) pp. 3071-3087.
Devlin et al. "High efficiency dielectric metasurfaces at visible wavelengths," eprint arXiv:1603.02735 (2016) pp. 1-18.

(56) References Cited

OTHER PUBLICATIONS

Toskov et al. "Modeling and fabrication of Pt micro-heaters built on alumina Substrate," Proceedings of the 36th International Spring Seminar on Electronics Technology (2013), pp. 1-7.
Fan, "Freeform Metasurface Design Based on Topology Optimization," MRS Bulletin, vol. 45, (2020), pp. 196-201.
Chen et al. "Flat optics with dispersion-engineered metasurfaces," Nature Reviews Materials, vol. 5 (2020), pp. 604-620.
Nie et al. Broadband Light Bending with Plasmonic Nanoantennas, Science, vol. 335 (2016), pp. 427-428.
Maniscalco et al., "Thin film thickness measurements using Scanning White Light Interferometry," Thin Solid Films, 550 (2014) pp. 10-16.
International Search Report and Written Opinion from International Application No. PCT/EP2021/071346, dated Nov. 3, 2021, 15 pp.
International Search Report and Written Opinion for PCT/EP2020/052379 dated Mar. 25, 2020.
Non-Final Office Action, issued in U.S. Appl. No. 16/834,588, dated Aug. 3, 2020, pp. 1-43, U.S. Patent and Trademark Office, Alexandria, VA.
Final Office Action, issued in U.S. Appl. No. 16/834,588, dated Oct. 15, 2020, pp. 1-33, U.S. Patent and Trademark Office, Alexandria, VA.
Non-Final Office Action, issued in U.S. Appl. No. 16/778,002, dated Jun. 19, 2020, pp. 1-20, U.S. Patent and Trademark Office, Alexandria, VA.
Notice of Allowance, issued in U.S. Appl. No. 16/778,002, dated Aug. 3, 2020, pp. 1-9, U.S. Patent and Trademark Office, Alexandria, VA.
Notice of Allowance, issued in U.S. Appl. No. 16/834,588, dated Dec. 4, 2020, pp. 1-10, U.S. Patent and Trademark Office, Alexandria, VA.
Notice of Allowance, issued in U.S. Appl. No. 16/944,918, dated May 25, 2021, pp. 1-10, U.S. Patent and Trademark Office, Alexandria, VA.
Non-Final Office Action, issued in U.S. Appl. No. 16/983,729, dated Apr. 26, 2021, pp. 1-20, U.S. Patent and Trademark Office, Alexandria, VA.
Final Office Action from U.S. Appl. No. 17/383,831, dated Feb. 28, 2023, pp. 1-16.
Office Action from U.S. Appl. No. 17/398,239, dated Feb. 28, 2023, pp. 1-26.
Partial European Search Report from European application No. 23205397.5-1020, Mar. 22, 2024, 16 pp.

* cited by examiner

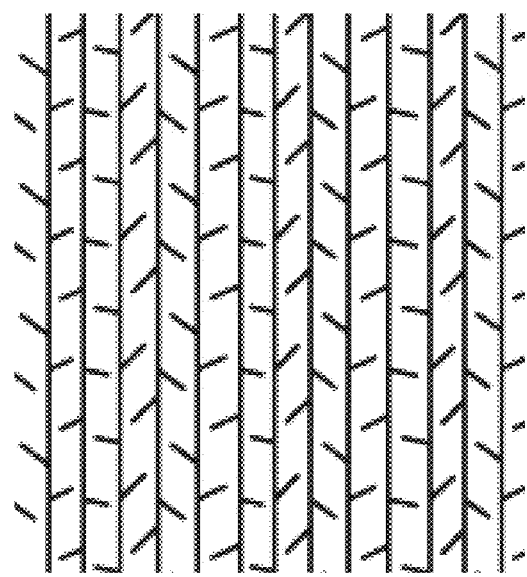 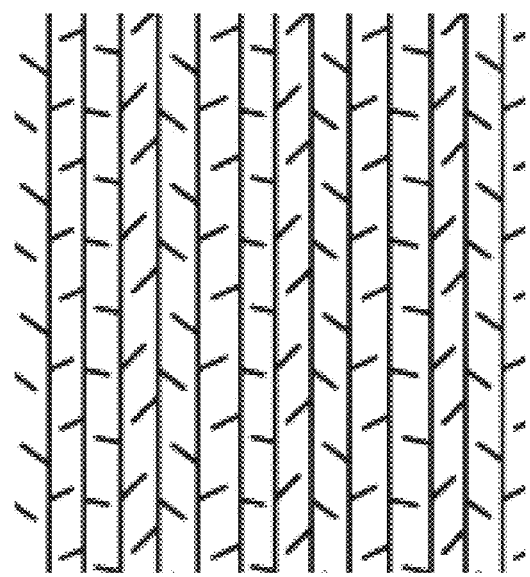
aba b a ba bab aba     abc a bc a bc a bc a
Fig. 5b

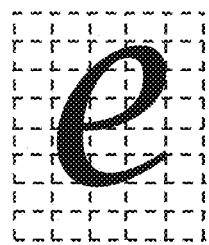 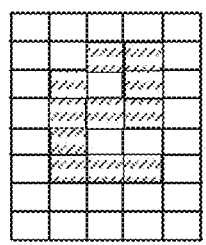
*Fig. 9a*     *Fig. 9b*
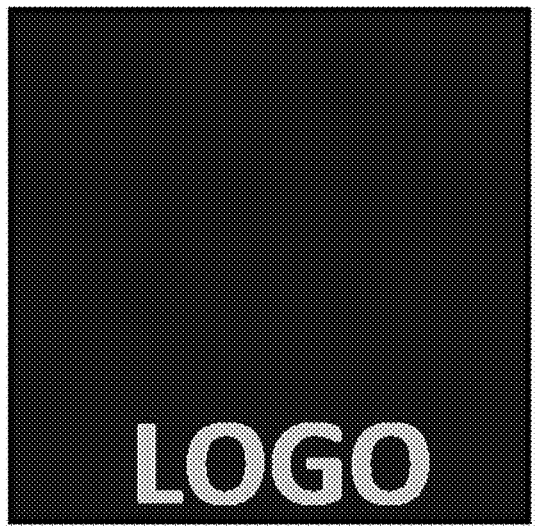 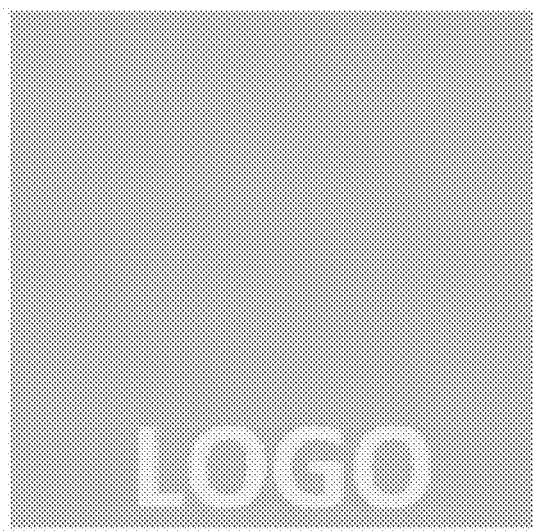
*Fig. 9c*     *Fig. 9d*
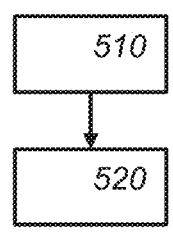
*Fig. 10*

LIGHT MODULATOR, SUBSTRATE COMPRISING ELECTRODES AND SMART GLAZING

FIELD

The presently disclosed subject matter relates to a light modulator, a substrate, a light modulator method and a computer readable medium.

BACKGROUND

Optically active glazing is known in the art. Typically, an optically active glazing system comprises two parallel plates, made from a transparent dielectric material such as glass or a plastic material. The internal volume defined between the plates is subdivided into a plurality of small independent volumes or individual cells that are filled with a dielectric fluid. The fluid contains a suspension of particles of a dielectric, charged or chargeable material. The facing faces of the two plates carry electrodes facing each other. The electrodes are connected to an electrical power supply associated with a control means.

The electrodes of each plate are formed by combs that are interleaved into one another in pairs. The electrodes of two interleaved combs are capable of taking up electrical voltages of polarities that are identical or opposite. With a suitable voltage on the electrodes the particles can be concentrated at different locations between the electrodes to give the system either a transparent or an opaque appearance.

There are various drawbacks associated with the known system. When the known glazing is in its transparent configuration, the electrodes that are applied to the plates cause a diffraction effect. A diffraction effect is undesirable for glazing. In some circumstances the presence of a diffraction effect can also be detrimental to safety. For example, if the optically active glazing is applied in a vehicle, such as a car, the presence of diffraction can be confusing or distracting for the operator of the vehicle.

Furthermore, driving of the known system can be improved.

Another drawback of the known system is that in the opaque configuration, a uniform appearance of the glazing is desired. This aspect can also impact safety. For example, if the glazing is configured half-way between opaque and transparent, then a lack of uniformity can be confusing or distracting. It is furthermore desired that the transition proceeds at a uniform speed across the glazing.

Yet another drawback of the known system is that the presence of physical contaminants may negatively affect device performance. For example, the presence of granules, fibers, rocks, lumps, grains etc. in the fluid may cause physical damage to the electrodes. Moreover, these contaminants may be electrically conductive, or may attract charges on their surface from fluid to become conductive, thereby disrupting or short-circuiting the electrical field between electrodes on the same substrates or on different substrates. These contaminants in various capacities all have a negative impact on the opto-electronic performance of the system. Moreover, they can cause disturbances of the desired current balance in the device, resulting in a shortened device longevity.

SUMMARY

It would be advantageous to provide improved substrates provided with electrodes, and an optical modulator comprising such improved substrates, that addresses these and other problems. The inventors found that the electrode design in the known system leads to diffraction, but also to a not fully uniform electric field. Addressing the first concerns leads to substrates that can be applied with less diffraction, a more uniformly opaque state and a more uniform transition speed across the substrates. Addressing the second concern leads to substrates that are less susceptible to detrimental effects of the presence of physical contaminants between the substrates.

Optically active glazing, in particular so-called smart glazing is an important application of transparent or reflective substrates on which electrodes are applied. A transparent or reflective substrate for applications such as these, e.g., smart glazing, may have two electrodes that each have multiple main lines. The lines are arranged on the substrate alternatingly, so that an electric field can be established between subsequent or adjacent lines by providing a potential difference to the electrodes.

From these main lines multiple branches may extend. By having branches extend at least half-way across the distance between two main-lines a better homogeneity may be obtained and/or a lower diffraction effect. Moreover, two subsequent branches that extend into the same area between a first main-line and a second main-line may overlap in the second direction when projected in the first direction. The branches increase the number of angles found on the substrate and therewith reduce the diffraction effect. For example, the angles may be chosen different from perpendicular and/or may be varied to further decrease diffraction. Diffraction can also be decreased by varying the distances between a main-line and a subsequent main-line on the substrate.

A substrate according to an embodiment may be used in a light modulator, also known as an optical modulator. For example, two such substrates may be arranged opposite to each other, so that charged particles suspended in a fluid between the substrates can be moved by applying voltages to the electrodes. Typically, the electrode designs for the bottom and top substrates are identical, but this is not necessary. Likewise, the two designs are typically aligned with each other, but this also is not necessary. The particles may absorb or reflect light. Reflection may be specular or diffusive, or in between. Particles may emit light, e.g., having phosphorescence or fluorescence.

A light modulator provides a panel of which transparency or reflectivity can be modified. In an embodiment, color or color intensity, etc., may be changed. A light modulator may be used as cover, e.g., a cover of a container, e.g., a closet, cabinet, and the like. A light modulator is also referred to, depending on the specific application, as ambient light modulator, dynamic light modulator, optical modulator, color modulator, IR modulator, UV modulator, IR active filter, UV active filter, or dynamic color filter.

An especially advantageous application is in optically active glazing, which is also referred to in the field as smart glazing, smart windows, controllable glazing, optical panel, electronic signage, dynamic light panel, dynamic color panel, active color panel, active light panel, active light surface, active color surface, dynamic light surface, or dynamic color surface.

In an embodiment, a controller is configured to apply an electric potential to the electrodes on the substrates of a light modulator to obtain an electro-magnetic field between the electrodes. The electro-magnetic field provides electrophoretic movement of the particles towards or from an electrode. As the particles change position, the optical properties of the panel changes, e.g., its transparency or reflectivity. If the particles are colored then also the color of the panel may change. By changing the pairs of electrodes between which a field is established the particles can be moved into a desired direction. The inventors found that control of a light modulator need not be restricted to solely changing between which electrodes a field is applied, but also can also comprise changing the maximum amplitude. Note that, advantageously, alternating current is used. For example, by driving with a lower maximum amplitude the rate of change in the light modulator is changed. This is advantageous, for example, when driving towards a desired target transparency or reflectivity, the maximum amplitude may be reduced to avoid overshoot. Maximum amplitude may also or instead be increased when starting driving towards a target transparency or reflectivity. For example, the controller may be configured to obtain one of multiple levels of transparency or reflectivity in the light modulator by using an alternating current or voltage of one of multiple maximum amplitudes. The relationship may be indicated by an algorithm, etc. The relationship between levels of transparency or reflectivity and maximum amplitudes can be governed by a look-up table, e.g., indicating a sequence of maximum amplitudes to drive toward a transparency or reflectivity. Note that alternating voltage is also possible.

Varying the maximum amplitude of the driving signal in addition to changing the electrodes between which a signal is applied may also be used to improve balanced driving. For example, the power, e.g., maximum amplitude, applied on some electrodes may be different than applied on others. For example, the controller may be configured to apply electric potential differences between subsequent electrodes on the same substrate and at the same time to apply electric potential differences between opposite electrodes on opposite substrates.

In embodiments there are at least two electrodes on each substrate, but there may be more than two electrodes. For example, at least three electrodes may be applied to at least one of the first substrate and the second substrate. For example, in an embodiment two electrodes may be applied to a first substrate and three electrodes to a second substrate.

A system in which one substrate has at least two electrodes and the other has at least three electrodes has various advantages. For example, such a light modulator may be driven so that the so-called curtain effect is reduced. The curtain effect happens during closing of the window, in which it appears that a curtain is drawn between the electrodes. The curtain effect is a disadvantage, as it is visibly distracting in itself, but it also increases diffraction. On a side with 3-electrodes the electrodes can be closer together than on 2-electordes, e.g., below 50 micron, more preferably below 40 micron, e.g. 35 micron. This means that the electric field is stronger. Accordingly, closing is faster and the curtain effect is reduced. With a 2+2 panel moving the electrodes closer together would lead to a reduced maximum transparency or reflectivity. But when an additional electrode is available this is avoided. When open some of the additional electrodes may be unused, so that there is little loss of maximum transparency or reflectivity. Additional electrodes on a substrate, e.g., electrodes over two, may be configured not to attract particles when opening panel, but to attract particles when closing the panel. For example, a panel in which each substrate has at least 2 electrodes may have together at least 4 electrodes. The substrates in a panel may have at least 5 electrodes, e.g., in 2+3 design; or, at least 6 electrodes, e.g., in 2+4, or 3+3 design; or at least 8 electrodes, e.g., in a 4+4 design, or as two 2+2 design stacked together using 3 substrates, the middle of which has two electrodes on each side.

The first substrate and the second substrate are arranged with inner sides opposite to each other, the multiple electrodes being applied to the inner side of each of the first and second substrates. As such, the first substrate and the second substrate each have an inner surface, whereby a part of the inner surface of each substrate is provided with the multiple electrodes, and part of this surface is not provided with electrodes but is in fluid contact with the particle-containing fluid. Thus, the inner side of each of the first and second substrates has a certain inner surface area, i.e., the total surface area occupied by the electrodes and the surface area of the inner surface not being occupied by electrodes. At least a part of the inner surface area of at least one of the first substrate and second substrate is provided with a protective coating. The protective coating prevents direct contact between contaminants such as granules, fibers, rocks, lumps, grains, etc. present in the liquid, and the electrodes. These contaminants can be formed in various ways, such as by agglomeration of smaller particles, static electricity, entrapment between electrodes, etc. Said contaminants may cause short circuits between electrodes on opposite substrates, adjacent electrodes on the same substrate, as well as cause physical damage to the electrodes themselves, or any combination of these.

As such, in an embodiment, the protective coating at least partially, or completely, prevents such contaminants from causing physical damage to the electrodes. In an embodiment, the protective coating prevents at least partially, or completely, such contaminants from causing short circuits between the electrodes. In one embodiment, the protective coating prevents both physical damage to the electrodes and short-circuiting between the electrodes.

The protective coating does not contribute essentially to the fundamental operation of the present technology and, therefore, does not require electrical or optical properties that are specifically linked to the electrode design and device operation as described herein. To prevent short circuits between electrodes, the protective coating largely does not conduct electrical charge or is electrically insulating. Thus, in an embodiment, the protective coating forms an electrically insulating layer between at least a part of the electrodes. In an embodiment, the protective coating has an electrical resistivity of at least $10^7 \Omega \cdot m$, preferably at least $10^9 \Omega \cdot m$, more preferably at least $10^{10} \Omega \cdot m$, more preferably at least $10^{11} \Omega \cdot m$. As used herein, the term "electrically insulating" is to be considered synonymous with "not electrically conducting" or simply "non-conducting" or non-conductive".

Such an electrically insulating layer may typically also form a mechanical barrier layer nearby and/or for the electrodes, also reducing physical damage to the electrodes. Thus, in an embodiment, the protective coating forms an electrically insulating layer and a mechanical barrier layer between contaminants present in the optical layer and at least a part of the electrodes. However, it is possible for the protective coating to only provide protection against mechanical damage to the electrodes. Thus, in an embodiment, the protective coating forms a mechanical barrier layer only. The protective coating may be provided to least a part of the inner surface area of at least one of the first substrate and second substrate, of only one of the first substrate and second substrate, or to both. The coating may be applied substantially or only to one or more areas provided with electrodes, substantially or only to one or more areas not provided with electrodes, or to a combination thereof. Typically, least a part of the inner surface area of at least one of the first substrate and second substrate on which electrodes are applied are provided with a protective coating. However, in some embodiments, the protective coating is substantially exclusively provided to those parts of the inner surface of at least one of the substrates that are not provided with electrodes.

The coating may be provided to at least a part of the surface area of the multiple electrodes, and may be provided to at least a part of the electrodes on only one substrate, or on both substrates. For example, only one substrate may be provided with a protective coating covering at least a part of the electrodes applied on said substrate, whereas the opposite substrate will not contain a protective coating covering the electrodes nor the substrate parts to which no electrodes are applied. Thus, in an embodiment, the protective coating is provided to at least a part of the surface area of the multiple electrodes on one of the first substrate and the second substrate, and wherein no protective coating is provided to the opposite substrate.

In another example, both substrates may be provided with a protective coating covering at least a part of the inner surface of said substrates. Thus, in an embodiment the protective coating is provided to at least a part of the surface area of the inner surface of both the first substrate and the second substrate.

The protective coating may cover a part of the total surface area of the electrodes on the inner side a substrate, may cover part of the total surface area of the inner side a substrate not covered by electrodes, or may cover substantially all of the inner surface area of a substrate, for example by means of a continuous, preferably homogeneous, coating covering substantially the entire inner side of the substrate and the multiple electrodes being applied to the inner side of the substrate. In an embodiment, the protective coating covers at least a total of 1%, preferably at least 10%, more preferably at least 20%, 30%, 40%, 50%, 60%, 70%, 80% or 90% of the total inner surface area of a substrate. In an embodiment, the protective coating covers at least a total of 1%, preferably at least 10%, more preferably at least 20, 30%, 40%, 50%, 60%, 70%, 80% or 90% of the total surface area of the multiple electrodes on a substrate. This total coated area may be distributed over the entire surface area occupied by the electrodes. The protective coating may be provided mainly or solely on areas of the substrate covered by electrodes, or mainly or solely on areas not covered by electrodes The protective coating may cover substantially all, or the entire surface area, of at least one of the first and second substrates such that both the electrodes applied on the substrate and the inner surface of the substrate to which no electrodes are applied is provided with the protective coating. For example, the protective coating may be in the form a continuous, preferably homogeneous, coating protecting substantially all, or all, electrodes applied on the inner side of the substrate from physical damage and/or short-circuiting. Such a full protective coating may be provided to the inner side of at least one of the first and second substrate. Such a full protective coating may also be provided to the inner side of only one of the first and second substrate, whereas the opposite substrate and the electrodes applied thereon is not provided with a protective coating. Thus, in an embodiment, the inner side of one of the first and second substrates is fully provided with a protective coating such that substantially the entire surface of the multiple electrodes applied on the inner side and the inner side of the substrate not provided with electrodes is covered with the protective coating, and wherein the opposite substrate is not provided with a protective coating. Such a full protective coating may also be provided to the inner side of both the first and second substrate. Thus, in an embodiment the inner sides, i.e., the entire inner surface areas, of both the first and the second substrate are fully provided with a protective coating such that substantially the entire surface of the multiple electrodes applied on the inner side and the inner side of the substrate not provided with electrodes are covered with the protective coating The thickness of the protective coating may widely vary. Typically, the protective coating has a thickness in the range of 1 nm to 100 μm, preferably in the range of 10 μm to 50 μm, preferably in the range of 100 nm to 10 μm. An appropriate lower limit to the thickness of the protective coating is determined, among others, by the required degree of electrical insulation, which in turn depends on the potential difference applied on the electrode and the expected conductivity of the contaminants. A suitable upper limit to the thickness of the protective coating is determined mainly by the smallest distance between electrodes on opposite substrates which is typically smaller than 500 microns, preferably smaller than 200 μm, preferably less than 100 μm, even more preferably less than 50 μm, such as less than 30 μm microns.

The choice of a suitable protective layer thickness is further determined by the degree of coverage applied to the first and/or second substrate. More specifically, whether a continuous, preferably homogeneous, protective coating is applied or an intermittent, discontinuous coating as will be described below, contributes to determining the minimum thickness required to achieve the desired effect of preventing short circuits and/or physical damage to the electrodes.

The protective coating may be applied in an interrupted form, wherein not the entire surface of the electrodes and not the entire surface of the interior of the substrate is coated with the protective coating. This discontinuous form of the coating may have a random pattern, or may form a regular pattern, which may be selected for a certain predetermined effect on the optoelectronic performance of the device.

In an embodiment, the protective coating is provided as a patterned coating. Such patterned coatings may be applied to the substrate side with electrodes using masks that are known in the art.

The pattern may be applied in such a way that some electrodes are provided with a protective coating, while others are not and are in fluid contact with the fluid. In an embodiment, a first main line on the first substrate is provided with the protective coating, and a second main line on the second substrate opposite the first main line is not coated, the second main line being in fluidic contact with the fluid, or vice versa. The pattern can be a regular pattern, with the electrode surface being covered with the protective coating in an alternating manner. In an embodiment, the multiple main lines on the first and second substrate are alternatingly provided and not provided with the protective coating.

The pattern is not limited to a one-dimensional pattern. For example, the protective layer could take the form of a mesh or a web, optionally a random web or a random mesh. Such protective coatings in the form of a web or a mesh may be similar for both substrates and or aligned in direction and position, but this is not necessary.

Combinations of the above-described patterns are possible both within the same substrate and for opposite substrates. For example, the inner side of a first substrate may be provided with a full protective coating substantially covering all electrodes and the inner side of the substrate not provided with electrodes, and the opposite substrate may not be provided with a coating. In an embodiment, a patterned coating is provided to at least a part of an inner side (thus covering a part of the electrodes and optionally a part of the substrate nor provided with electrodes) of one of the first substrate and the second substrate, but not to the opposite substrate. In embodiment, the coating is provided to the inner side of at least one of the first and second substrates in a random pattern, such that at least a part of the multiple electrodes applied on the inner side and/or at least a part the inner side of the substrate not provided with electrodes is provided with the coating, and at least a part of the multiple electrodes applied on the inner side and the inner side of the substrate not provided with electrodes is not provided with the coating.

It is not required that the protective coatings on the substrates are aligned with respect to each other. However, a discontinuous protective coating such as for example a mesh may be applied on both substrates with the main lines of these meshes forming an angle to each other, such as for example a 15-, 30-, or 45-degree angle. In another example, the protective coating is applied in the form of parallel lines on both substrates, whereby the parallel lines on one of the two substrates are rotated 90 degrees with respect to those on the opposite substrate. In this way, mesh-type patterns of protecting coatings can be produced by the combination of line patterns on opposite substrates.

In an exemplary embodiment, a protective coating having a thickness in the range of less than 10 nm is employed when at least one of the substrates is fully provided with a protective coating, i.e. when substantially the entire surface of the multiple electrodes and the inner side of the substrate not provided with electrodes is covered, preferably substantially homogeneously, with the protective coating. In an exemplary embodiment, protective coatings with a thickness of 1 micron or more lend themselves to coatings applied as a discontinuous layer, whether or not in a specific pattern, to at least a part of only the electrodes, to at least a part of only the inner surface of the substrate not provided with electrodes, or a combination thereof. In an exemplary embodiment, protective coatings having an intermediate thickness, i.e. in the range of 10 nm-1 micron may be employed both as a full, continuous coating and as a discontinuous coating.

As mentioned above, the protective coating can be provided uniformly across the inner surface area of the substrate or patterned to specific areas. In other words, the protective coating is not necessarily fully continuous, and intrinsic gaps, pinholes, cavities etc. can be tolerated as long as their size and distribution is significantly lower than those of the larger physical contaminants. Thus, such gaps can be allowed in the protective coating, provided the maximum dimensions of the gap do not exceed the smallest distance between two electrodes on the substrate for the coating to have the intended protective effect.

By the same token, the size of the contaminants that is still tolerated is determined by the electrode design or pattern, by the distance between electrodes on one and the same substrate, and by the distance between electrodes on opposite substrates. Thus, the quality and continuity of the protective layer is defined by the need to statistically limit or eliminate the impact of these contaminants on device appearance and performance. As an example, it may be imposed that the protective layer may permit gaps in the protective coating extending to a maximum of 90% of the smallest distance between separate electrodes on the same substrate or on opposite substrates, i.e. the smallest distance between electrodes of the same substrate and the cell gap of the device.

The protective coating may be made of a wide variety of materials and combination of materials, those skilled in the art will be able to choose suitable materials that meet the requirements described above in terms of protection against physical damage and short-circuits, as well as thickness, homogeneity of the coating, method of driving the device, etc. Suitable materials are, for example, inorganic materials and compositions such as silicon nitride, silicon dioxide, silicon oxynitride, polysilicon, amorphous silicon, aluminum oxide, tantalum pentoxide, and zirconium oxide and combinations thereof, as well as organic or polymeric materials including, but not limited to polyimide, fluoropolymer, silicone resin, polytetrafluoroethylene, polyimide resin, photoresist, epoxy resin, and benzocyclobutene-based polymer and combinations thereof. Combinations of these inorganic materials and compositions and organic and/or polymeric materials are also possible. The protective coating material be rigid or non-rigid. In an exemplary embodiment, the protective coating material is non-rigid.

Depending on the chosen application and the thickness of the coating, the protective coating can be transparent, semi-transparent or reflective, for a specific color or for a broad wavelength range. In some embodiments, the protective coating is a transparent or a semi-transparent coating. In some embodiments, the protective coating is a reflective coating. Combinations of transparent, semi-transparent and/or reflective parts of coating on the same substrate, or on opposite substrates are also possible. In some embodiments, the protective coating provides additional optical functions to the device. In some embodiments, this is an independent optical function. In some embodiments, this is an optical function that cooperates with the electro-optical effects of the device. These can be, for example, reflective, anti-reflective, diffusive, and/or anti-diffractive effects for all light wavelengths, or for part of the electromagnetic spectrum such as UV, visible, and/or IR.

The protective coating materials may be selected to be of refractive indexes sufficiently different from the fluid solvent refractive index to generate significant light refraction. For example, a protective coating made of silicon nitride having an optical refractive index of 3 may be combined with a fluid solvent with optical refractive index below 2. The refractive index differences will induce incoming light refraction, a change of light direction following Snell's law. The light modulator can then direct incoming light to designed specific directions. This effect can be combined with specific shapes and topography of the patterned protective coatings to refract lights in multiple directions and therefore increase light diffusion or haze. Similarly, different protective coatings from the same substrates or from different substrates to enhance specific light paths or diffusions are possible.

The difference between the refractive indexes of the substrates and of the particle-containing fluid can generate light reflection. Introducing a protective coating, patterned or not patterned, made of materials exhibiting intermediate optical refractive indexes limit back reflection and therefore generate an anti-reflecting coating. Similarly, combinations of various protective coatings on one or all substrates can lead to minimizing incoming light back reflection or enhancing internal reflection. Here, light should be considered for the whole light spectrum or for parts of it, such as ultraviolet, visible or infrared spectra or combinations thereof.

The protective coating materials can also be absorbing light in the visible range, such as absorbing all visible light and appearing black. Shapes and positions of the protective coatings on one or more substrates can induce diffraction of light. The addition of such protective coatings can enhance diffraction patterns already induced by the substrate design or the device design or, on the opposite, add new diffraction directions to the light to create a scattered effect and an increase of blurriness. Here a black protective coating layer is exemplified, but it can be applied to other kinds of light absorption dedicated to specific diffracted system, including but not limited to ultraviolet or infrared wavelengths range. Moreover, the addition of specific patterns, shapes and optical properties of the protective coatings on one or more substrates can counteract the diffraction of light induced initially by the substrates or by the device to refocus the incoming light to its original direction. The integration of such coating layer in the device will enhance the capability to recover light diffraction and therefore demonstrate an anti-diffractive effect.

Depending on the material or the combination of materials chosen, the protective coating may be applied using a variety of techniques that are known in the art, such as sputtering, molecular-beam epitaxy, pulsed laser deposition, electron beam evaporation, chemical vapor deposition, atomic layer deposition, spin-coating, flexoprinting coating, dip coating, spray-coating, inkjet printing, slit coating, and combinations thereof.

The protective coating may be applied using a reflow process step that allows for a more homogeneous formation of the protective coating on both the electrodes and the remaining, non-electrode-covered inner surface of the substrate. For example, a reflow process can be added after deposition and optionally patterning of the coating, resulting in homogenization of the protective coating and improved conformality with the topography of the substrate. Typically, reflow processing is a thermal process that can be conducted in various ways, including oven heating, hot plates, infrared irradiation, laser irradiation, microwave irradiation, infrared conveyor, and combinations thereof. Chemical reflow processing can also be performed in the case of a protective coating made of or comprising organic materials, for example by swelling the coating using solvent vapor or liquid immersion.

In an embodiment, the protective coating is a single layer. In an embodiment, the protective coating is a multilayer protective coating. In some embodiments, a multilayer protective coating may include alternating layers of different material composition. For example, a combination of a protective coating comprising a polymeric layer deposited on an inorganic layer is possible. A single substrate may also contain multiple protective layers of different materials, compositions and dimensions.

The materials used for the protective coating may be different between substrates or multiple protective coatings made of different materials may be provided on the same substrate.

A further aspect of the invention is a building comprising a light modulator according to an embodiment. A further aspect of the invention is a car comprising a light modulator according to an embodiment. For example, the car and/or building may comprise the light modulator and a controller configured for controlling transparency or reflectivity of the light modulator by controlling voltage on electrodes of the light modulator, the controller being electrically connected or connectable to the light modulator.

Smart glazing is an electronic device, which may be driven by a power source, e.g., under control of a controller. For example, the controller may instruct the power source to apply a particular waveform to particular electrodes to achieve various transparency or reflectivity effects or the lack thereof.

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example only, with reference to the drawings. Elements in the figures are illustrated for simplicity and clarity and have not necessarily been drawn to scale. In the figures, elements which correspond to elements already described may have the same reference numerals. In the drawings, FIG. 1a schematically shows an example of an embodiment of a substrate, FIG. 1b schematically shows an example of an embodiment of a substrate, FIG. 1c schematically shows examples of embodiments of branches, FIG. 1d schematically shows an example of an embodiment of a first electrode and a second electrode arranged in a pattern across a substrate, FIG. 2a schematically shows an example of an embodiment of a substrate, FIG. 2b schematically shows an example of an embodiment of a substrate, FIG. 2c schematically shows an example of an embodiment of a substrate, FIG. 3 schematically shows an example of an embodiment of a substrate, FIG. 4a schematically shows an example of an embodiment of a substrate, FIG. 4b schematically shows an example of an embodiment of a substrate, FIG. 4c schematically shows an example of an embodiment of a substrate, FIG. 5a schematically shows multiple examples of embodiments of a substrate, FIG. 5b schematically shows an example of an embodiment of a substrate arranged for two or for three electrodes, FIGS. 6a and 6b schematically show a comparative example of a substrate, FIGS. 6c and 6d schematically show an example of an embodiment of a substrate, FIG. 7a schematically shows an example of an embodiment of a light modulator, FIG. 7b schematically shows an example of an embodiment of a light modulator, FIG. 7c schematically shows an example of an embodiment of a car, FIGS. 8a-8c schematically show an embodiment of a light modulator, FIG. 9a schematically shows an example of an embodiment of a logo and a grid, FIG. 9b schematically shows an example of an embodiment of a substrate, FIG. 9c-9d schematically show an example of an embodiment of a substrate, FIG. 10 schematically shows an example of an embodiment of light modulator method for controlling a light modulator, FIG. 11 a schematically shows a computer readable medium having a writable part comprising a computer program according to an embodiment, FIG. 11b schematically shows a representation of a processor system according to an embodiment, FIG. 12-37 schematically show examples of embodiments of a light modulator, FIG. 38 schematically shows an example of a physical contaminant causing an electrical short between electrodes on opposing substrates in a prior art light modulator, FIG. 39 schematically shows an example of a physical contaminant causing an electrical between adjacent electrodes on a single substrate in a prior art light modulator, FIGS. 40-45 schematically show examples of embodiments of a light modulator.

LIST OF REFERENCE NUMERALS

Figure 1A:
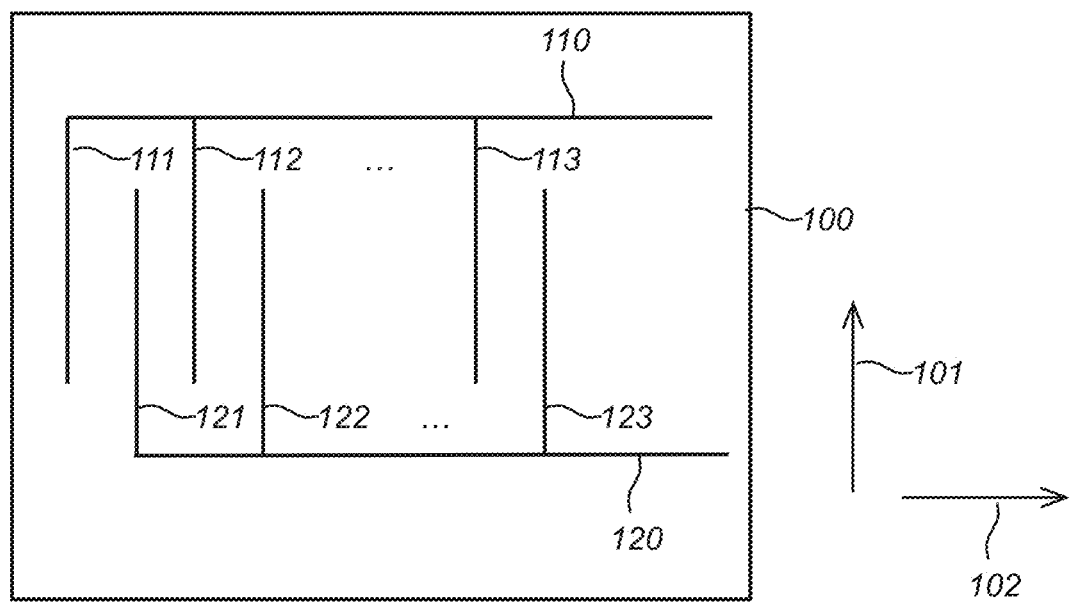

The following list of references and abbreviations is provided for facilitating the interpretation of the drawings and shall not be construed as limiting the claims.

10 a light modulator
11 a first substrate
12 a second substrate
13, 13a, 13b electrodes
14, 14a, 14b electrodes
15 a fluid
16 a controller
30 particles
20 a car
21 a light modulator
40 a light modulator
41 a first substrate
42 a second substrate
43 a third substrate
46 a controller
100 a substrate
101 a first direction
102 a second direction
110 a first electrode
120 a second electrode
111-113 a main-line
121-123 a main-line
131-134 a branch
141-144 a branch
150 an area
151 half a distance between two subsequent main-lines
152 a distance between two subsequent branches
153 a distance between two subsequent main-lines
161 a projection
162 a virtual line
171-174 a substrate
200 a substrate
201-206 a main-line
251-253 a distance between subsequent main-lines
221 a first part
222 a connecting part
223 a second part
231 a line gap
232 a distance
300 a substrate
301 a main-line
310, 320 a sub main-line
311 a connection
321, 322 a sub main-line
400 a substrate
410, 420 a main-line
411,412 a branch
421.422 a branch
450 a substrate
451-454 a block

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them. Further, the subject matter that is presently disclosed is not limited to the embodiments only, but also includes every other combination of features described herein or recited in mutually different dependent claims.

FIG. 1a schematically shows an example of an embodiment of a substrate 100. There are at least two electrodes arranged in a pattern across a surface of substrate 100. Shown in FIG. 1a are two electrodes on the same surface: a first electrode 110 and a second electrode 120. There could be more than two electrodes on the same side of the substrate, e.g., to facilitate more fine-grained control. For example, multiple electrodes may be used to facilitate a segmented substrate, e.g., for a segmented light modulator. For example, in a segmented light modulator some zones may have different optical properties, e.g., a different transparency or reflectivity. Below an embodiment with two electrodes is shown, but additional electrodes could be added to them, e.g., by replicating similar structures next to each other.

First electrode 110 and second electrode 120 are applied to a same side of the substrate. The two electrodes are arranged in a pattern across the substrate. There could also be one, two or more electrodes on the other surface of substrate 100, e.g., to facilitate stacking of three or more substrates. Applying electrodes to a substrate may be done lithographically, e.g., using a mask representing the electrodes pattern. Electrodes may also be applied by embedding them in the substrate.

First electrode 110 and second electrode 120 each comprise a multiple of main-lines. As shown in FIG. 1 a, first electrode 110 comprises main-lines 111, 112, and 113, and second electrode 120 comprises main-lines 121, 122 and 123. Typically, each electrode will comprise more lines than three. The main-lines extend across the substrate. The multiple of main-lines of the first and second electrode are arranged alternatingly with respect to each other on the substrate. The main-lines extend across the substrate in a first direction 101. When viewed in a second direction 102, the main-lines are encountered alternately from different multiples, e.g., from the first and second multiple in the first and second electrode respectively. The first and second direction make an angle with each other, typically the angle is substantially perpendicular. The first and second direction may each be parallel to a side of the substrate, but this is not necessary.

A motivating application for a substrate such as substrate 100 is in smart glazing, e.g., a light modulator, which may be applied in domestic housing, offices, green houses, cars, and the like. The level of transparency or reflectivity of the smart glazing can be adapted electrically. For example, in smart glazing two substrates such as substrate 100 would be stacked so that the sides on which the two electrodes are applied face each other. A fluid with particles is enclosed between the two substrates. Smart-glazing embodiments are further discussed below. In an embodiment, electrodes, e.g., two or more electrodes are applied to one surface of each substrate. There could also be one, two or more electrodes on the other surface of substrate 100, e.g., to facilitate stacking of three or more substrates.

Some embodiments below show examples of modulating a transparency or reflectivity level. Light modulators may be adapted for other optical effects. For example, if desired, embodiments could be modified to different levels of translucency instead of different levels of transparency. If desired, the type of particle that is used can be used in an embodiment can be varied, e.g., to particles that differ in which wavelengths they absorb or reflect, and how specular of diffuse the reflection is. For example, in an embodiment, a light modulator can modulate different levels of reflection. Particles can also emit light. Stacking multiple optical layers further increases the possibilities.

Having two sets of alternating main-lines is sufficient to provide electrically adaptable glazing; due to the alternating two sets the electric field at any part of the substrate can be controlled as two opposite electrodes border the part from two opposing sides.

Figure 1B:
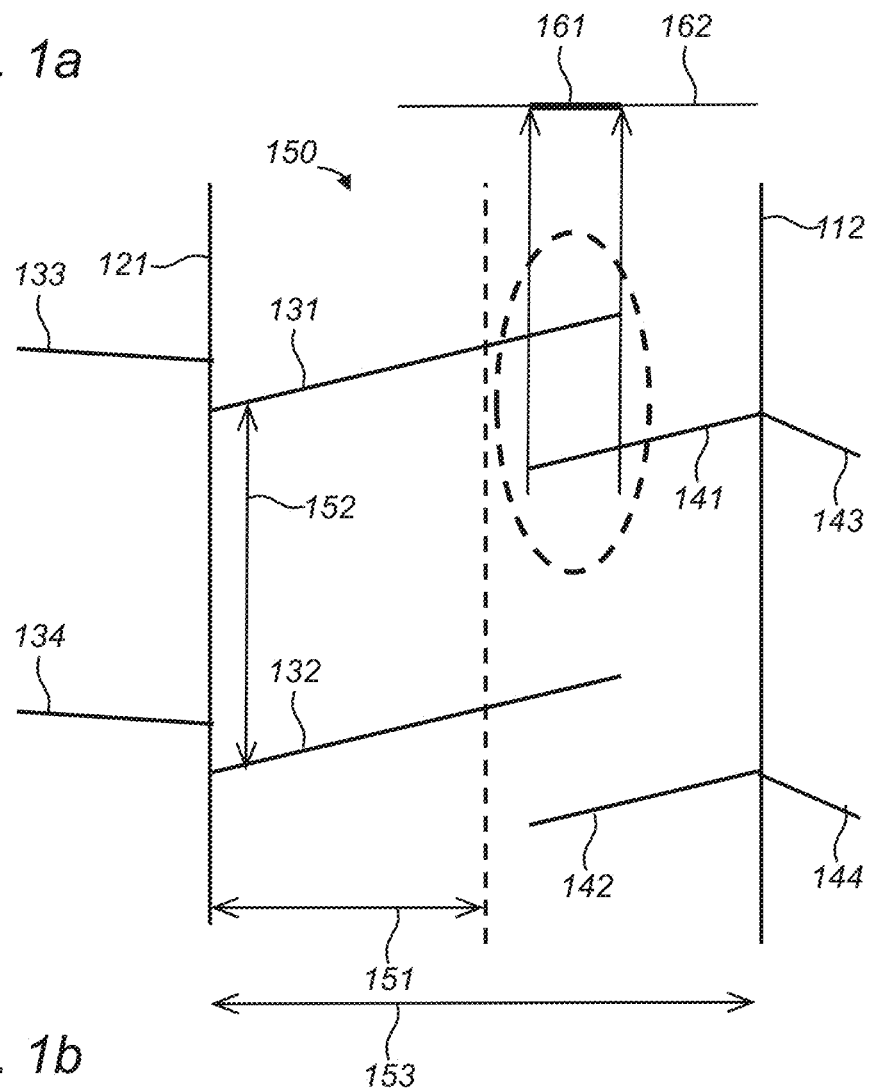

FIG. 1b schematically shows an example of an embodiment of a substrate 100. Two of the main-lines of substrate 100 are shown in FIG. 1b. Shown are main-line 121 and main-line 112. These main-lines may run across a main part of the substrate, e.g., spanning substantially the entire substrate.

By adapting the shape of the electrodes undesirable diffraction effects can be altered. Decreasing the diffraction effect is especially important for transparent substrates, since for, e.g., a reflective display, such as might be applied in an e-reader, the effect will not be noticed. The inventors found that the optical diffraction may be decreased by orienting the line shapes of the electrodes in multiple different angles so as to spread the diffraction in space and therefore decreasing the intensity of the most intense diffraction spots.

As shown in FIG. 1b, multiple branches are attached to the main-lines and extend therefrom. Shown in FIG. 1b are branches 131-134 comprised in electrode 121, and branches 141-144 comprised in electrode 112. The branches are attached to a main-line and extend into the areas between the main-lines. FIG. 1b shows one such area: area 150 between electrode 121 and electrode 112. Branches 131 and 132 of electrode 121 and branches 141 and 142 of electrode 112 extend into area 150 between electrode 121 and electrode 112. Like the main-lines, also the branches alternate. In particular, the branches that extend into the same area from two different electrodes alternate, e.g., when viewed in the first direction. In this example the branches 142, 132, 141 and 131 belong alternatively to electrode 112 and 121. Thus, in an embodiment, the main-lines alternate when viewed in the second direction, while the branches alternate when viewed in the first direction. A branch is comprised in either the first or in the second electrode. Typically, the first and second electrode including their main-lines and branches are not directly electrically connected so that an electric field may be established between the first and second electrode including between their main-lines and branches.

For example, if one were to draw a virtual line in the overlapping region parallel to the two subsequent main-lines, then the virtual line would intersect alternatingly with a branch from the first main-line and with a branch from the second main-line, and so on.

Extending branches from the main-lines has several advantages. The branches impact the diffraction of the substrate even for a straight main-line. On the other hand, branches increase the risk of disturbing the homogeneity of the electric field. In particular, hot-spots may be created in places where the tips of the branches are close and weak-spots elsewhere. In an embodiment, at least one of two subsequent branches that extend into the same area extend at least half across the area. As a result, the non-transparent state may be more homogeneous, and transitions between states may be quicker and/or more homogeneous.

If the branches are perpendicular to the main-line, while the points where the branches originate on one main-line are exactly opposite (seen in the second direction) the originating point on a neighboring main-line, then the branches cannot overlap. In that case, branches originating from one main-line are collinear with a branch from the opposite main-line, e.g., so that extending a branch would make it coincide with a branch from the opposite main-line. In such a case, there is a risk that hot-spots are created in places where the tips of the branches are close and weak-spots elsewhere. This can be avoided, e.g., by an appropriate angle so that there is appropriate overlap. For example, the angle may depend, e.g., on the line width and the line gap.

Avoiding hot-spots, e.g., with collinear branches, e.g., perpendicular branches may, in an embodiment, be avoided by interdigitating the branches. For example, the points on the main-lines where the branches originate may be off-set, or staggered, with respect to each other. The angles may be chosen so that a branch does not intersects a next branch. The staggering may be used to avoid that branches are collinear. In an embodiment, branches are perpendicular to their main-line, and staggered with branches of a subsequent main-line. In an embodiment, branches are not non-perpendicular, and may or may not stagger. In an embodiment, for example, branch angles may be selected from a range, say from about 5 to about 85 degrees. For very large line-gaps, the angle may become closer to perpendicular.

In FIG. 1b, a dashed-line is shown midway between electrode 121 and electrode 112. The distance 151 between electrode 121 and the mid-way line is half the distance between two subsequent main-lines 153. The dashed line is virtual and not actually visible in an embodiment. Shown in FIG. 1b is that branches 131 and 132 extend over the dashed-line, that is they extend at least half across area 150. For example, one may project branch 131 or 132 on a virtual line 162 in the second direction 102. The length of projected branches 131 and 132 is larger than half the distance between electrodes 121 and 112. Branches on the opposite main-line may or may not exceed over half the distance between the main-lines; As shown in FIG. 1b, branches 141 and 142 do not, but branches 141 and 142 could be extended so that pass the dashed mid-line.

In an embodiment, the branches make an angle with their electrode that is substantially different from orthogonal, e.g., at least 5 degrees (out of 180) different, e.g., at least 5% of a right angle, etc. Having different values reduces the diffraction effect.

Figure 5A:
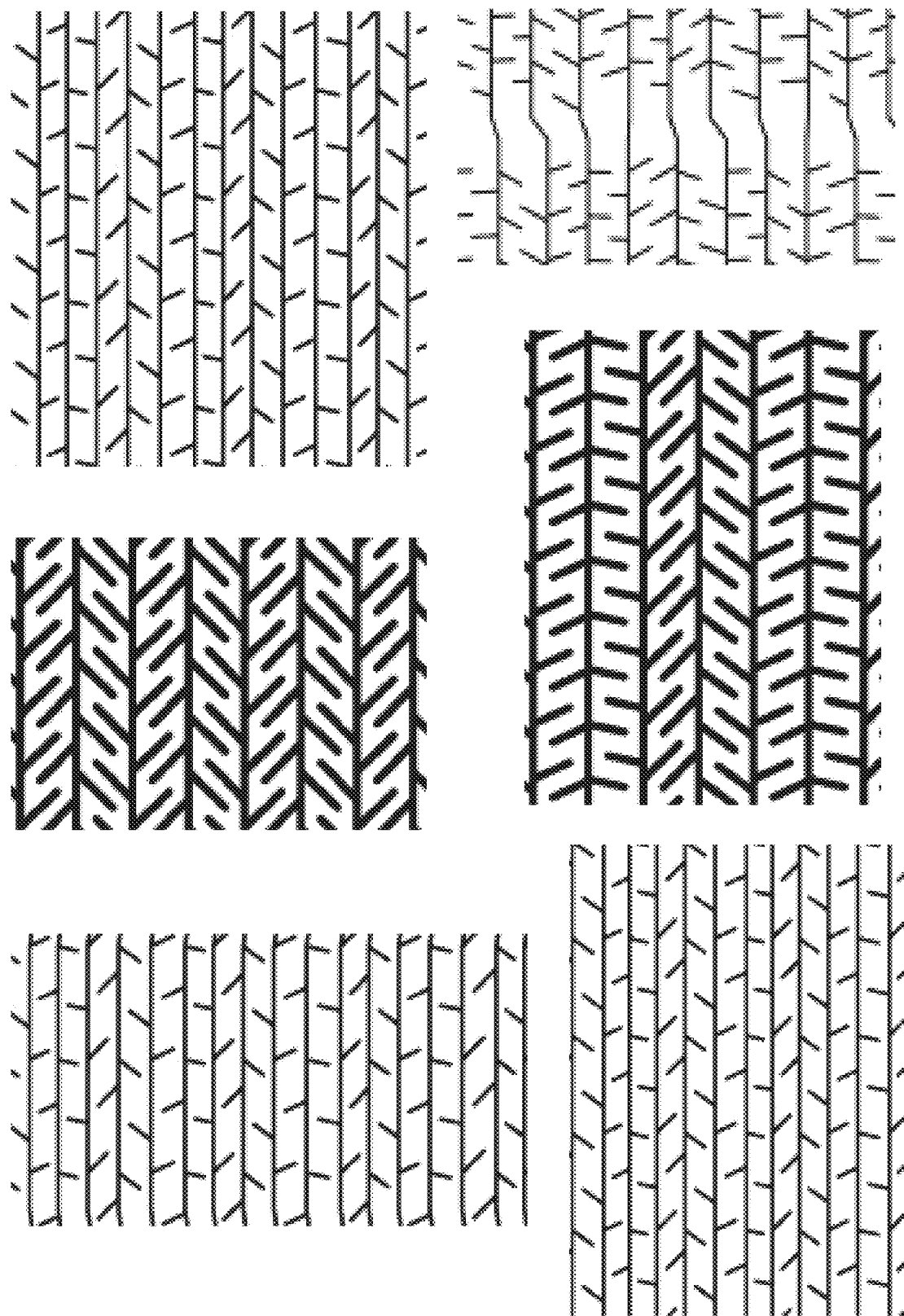

In an embodiment, the two subsequent branches that extend into the same area between a first main-line and a second main-line overlap in the second direction when projected in the first direction. For example, FIG. 1b shows two subsequent branches: branch 141 and 131. The region where these two branches overlap is indicated with a dashed oval in FIG. 1b. When the two subsequent branches are project in the first direction on a virtual line 162 running in the second direction, the branches 131 and 141 overlap in projection 161. FIG. 5a shows examples with both smaller and larger overlap.

For example, successful simulations were performed for embodiments having branches that penetrate into the area by the following amounts: 60-50; 63-46; 64-45; 60-46; 65-61; 83-78; 95-95. In FIG. 1b shows branches with penetrations of 80-40 and overlap 20, in a percentage of the line-gap. These numbers refer to the percentage of the line-gap the branches penetrate. The length of the branch is measured here only along the second direction, e.g., after projecting in the first direction. The length of the overlap, in the second direction, in some embodiments may for example, be: 10; 9; 9; 6; 26; 61, 95, etc. The latter expressed as a percentage of the line-gap.

In an embodiment, the distance from the tip of a branch, e.g., branch 131 to the subsequent main-line, e.g., main-line 112, is about equal to the distance between branch and a subsequent branch, e.g., between branch 131 and 141. For example, the larger of these two distances may be less than 110% of the smaller of these distances.

In an embodiment, two subsequent branches from the same main-lines that extend into the same area between a first main-line and a second main-line have a distance to each other, measured in the first direction, which may be much smaller than the line gap. For example, said branch distance may be only 5% of the line gap, or less. Other embodiments have larger distances though, e.g., of 30% of the line gap, or more. For example, branch 131 and 132 extend into the same area between main-lines 121 and 112.

Generally speaking the advantageous effects, e.g., of applying branches, increases if branches are applied across the design. For example, it is not necessary that branches are applied in all parts of a substrate, however, doing so allows the positive effects of branches to be appreciated in all parts. There may be various reasons not to use branches in some parts though, for example, the optical difference may be desired, e.g., to visually distinguish that part, or that part uses a different way of avoiding diffraction, e.g., waves.

Figure 1C:
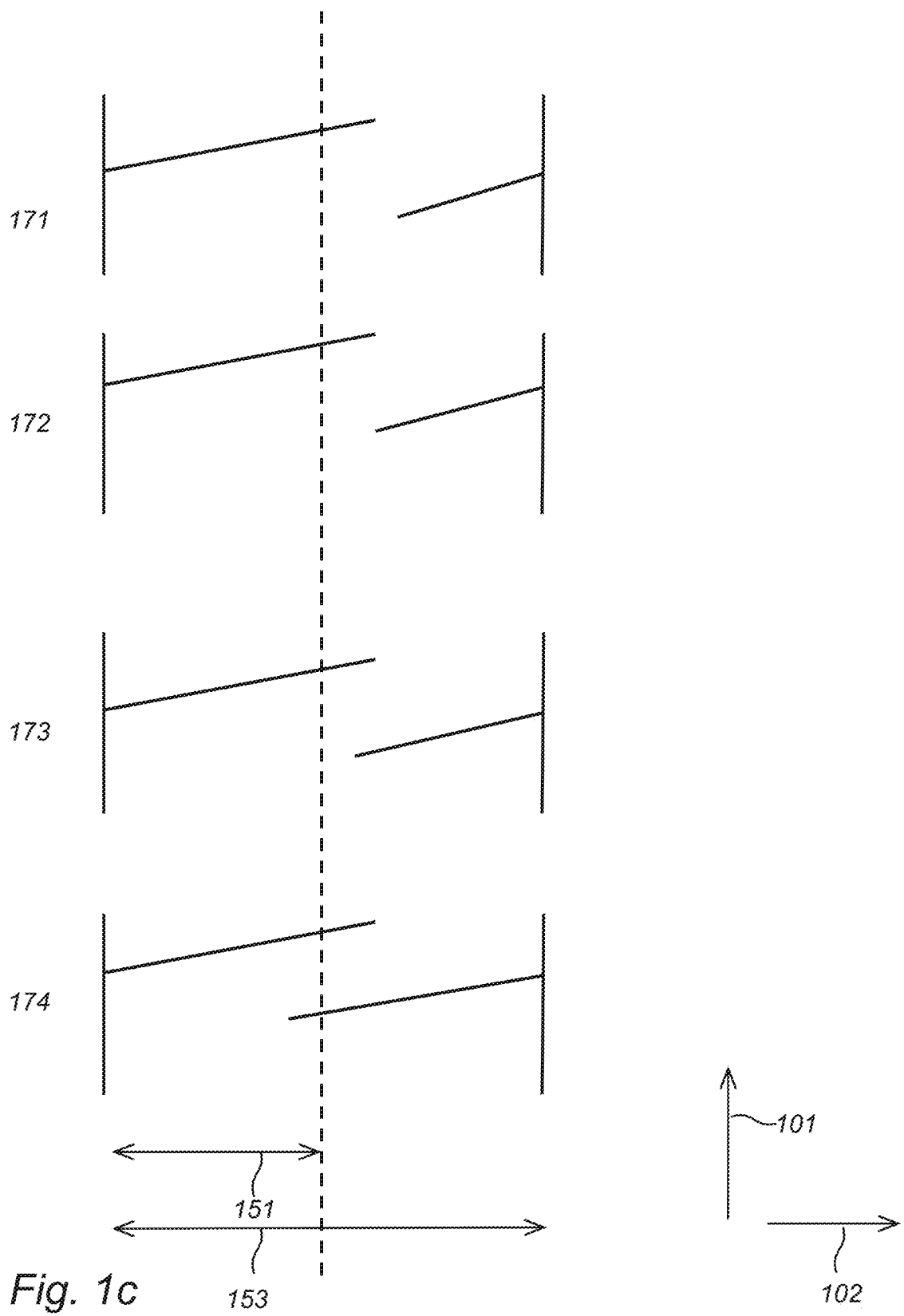

FIG. 1c schematically shows examples of embodiments of branches in substrates. FIG. 1c is drawn to scale. In substrate 171 an example is shown in which two subsequent branches do not overlap; as shown there is a gap of −5%. In substrate 172 an example is shown in which two subsequent branches do not overlap, but reach until the same point in the area between two main-lines; as shown there is a gap of 0%. In substrate 173 an example of an embodiment is shown in which two subsequent branches have an overlap of 5%. In substrate 174 an example of an embodiment is shown in which two subsequent branches have an overlap of 20%. Substrate 174 shows that branches extending into the same area from either side may extend over half the line-gap. Overlapping branches reduces the tendency for hotspots.

Two subsequent branches of different main-lines may have the same length, or may have a different length. This offsets the region where the two branches overlap.

For example, in an embodiment the longer branch may be at least 5% longer than the shorter branch. For example, the longer branch may be at most 50% longer than the shorter branch. For example, the length of the longer branch, e.g., measured along the branch may be 1.05 times the length of the shorter branch, e.g., measured along the branch. In an embodiment, the longer branch may be between 4% and 40% longer than the shorter branch.

For example, in an embodiment, two subsequent branches of different main-lines have the same length.

In an embodiment, an electrode comprises multiple straight main-lines from which branches extend. The main lines, also called central-lines, may be parallel to each other. The distance between two branches is referred to as the branch gap, e.g., distance 152. The distance between two main-lines is the line-gap. Pitch may be one line gap plus one line width, that is, the width of one entity which may be repeated.

For example, the distance between the points where branches originate on a main-line may be referred to as the branch gap. The branch gap may be constant for branches that extend into the same area. The branch gap may vary, even along a main-line. The branches may alternate, or stagger, for example, they may be mis-aligned with half the branch gap between them. An advantage of branches is that they allow to homogenize the distance between the electrodes and therefore the electric field that can be established between the electrodes. At the same time they allow reducing the diffraction effect, e.g., by disturbing the repeatability of the design.

In an embodiment, the electrode lines have a width selected from a range of about 1 to 50 micrometers. The line-gap may be selected from a range of about 50 to 100000 micrometer. For example, the line-gap may be 800 micrometers, e.g., in the range from 50-1000 micrometer, though much larger line-gaps are also possible. Having branches allows having large line-gaps, while keeping a homogenous electric field. Increasing the line gap reduces the diffraction effect associated with the main-lines. In an embodiment, the line-gap is at least 500 micrometer.

In an embodiment, the length of branches may vary. For example, branch lengths may alternate along a main-line, or follow a sequence of repeating branch lengths, etc. This has the advantage of staggering the points of maximum electric field. This is particularly advantageous with large line-gaps, say over 500 micrometres, or the like. For example, subsequent branch length may differ by as much as, say, 60% in an embodiment.

Figure 1D:
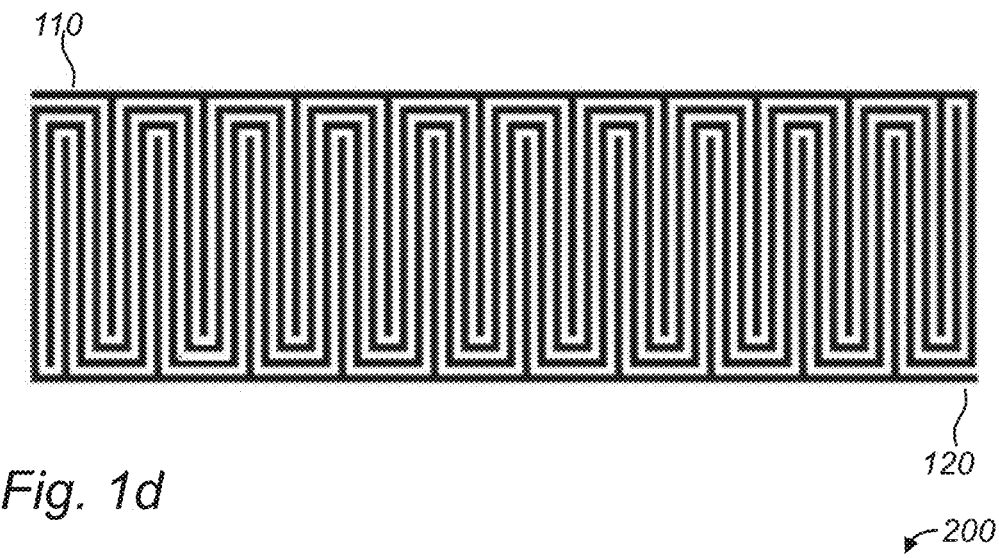

In an embodiment, the multiple main-lines of the first and second electrodes are arranged alternatingly with respect to each other on the substrate. One way to achieve that is by shaping the first and second electrode in a comb shape, wherein the comb's fingers are the main-lines. By interdigitating the fingers of the two combs, an interdigitating pattern is obtained. It is not necessary to use two comb shapes. For example, figure id schematically shows an example of an embodiment of a first electrode and a second electrode arranged in a pattern across a substrate. For simplicity FIGS. 1a and 1d show only the main-lines and not the branches. The pattern is created so that there is no direct electric contact between the two electrodes. A minimum distance between the two electrodes may be enforced.

A branched design contributes to reducing diffraction, because it increases the number of angles on the substrate. Moreover, many parameters can be varied to increase this effect. For example, the length of branches, the angle of branches, the distance between branches along a main-line, line-gap, etc. Preferably, the branches in the same area are at least locally parallel, so that the branch angle on the right of a main-line is the same as the branch angle on the left of the next main-line. If the line-gap is varied, then the branch distance may also vary, e.g., proportionally dependent of the line gap; for example, one may maintain a maximum electrode distance, e.g., between two subsequent branches to enforce a minimum strength in the electric field.

Figure 2A:
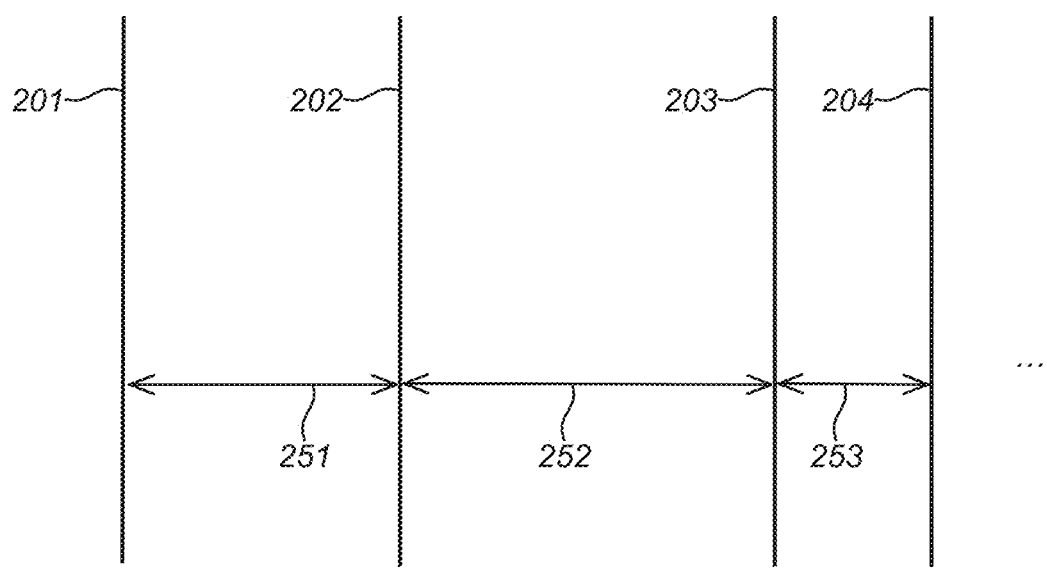

FIG. 2a schematically shows an example of an embodiment of a substrate 200. Four of the main-lines are shown in FIG. 2a: main-lines 201-204. For example, main-lines 201 and 203 may be comprised in a first electrode, e.g., electrode 110, and main-lines 202 and 204 may be comprised in a second electrode, e.g., electrode 120. Shown is the line-gap 251, e.g., the distance between main-lines 201 and 202. Also shown is the line-gap 252 between main-lines 202 and 203, and the line-gap 254 between main-lines 203 and 204. In this example, the line-gaps vary in the second direction. For example, line-gap 251 differs from line-gap 252 which differs from line-gap 253. Varying line-gaps contribute to the reduction of the diffraction effect.

Figure 2B:
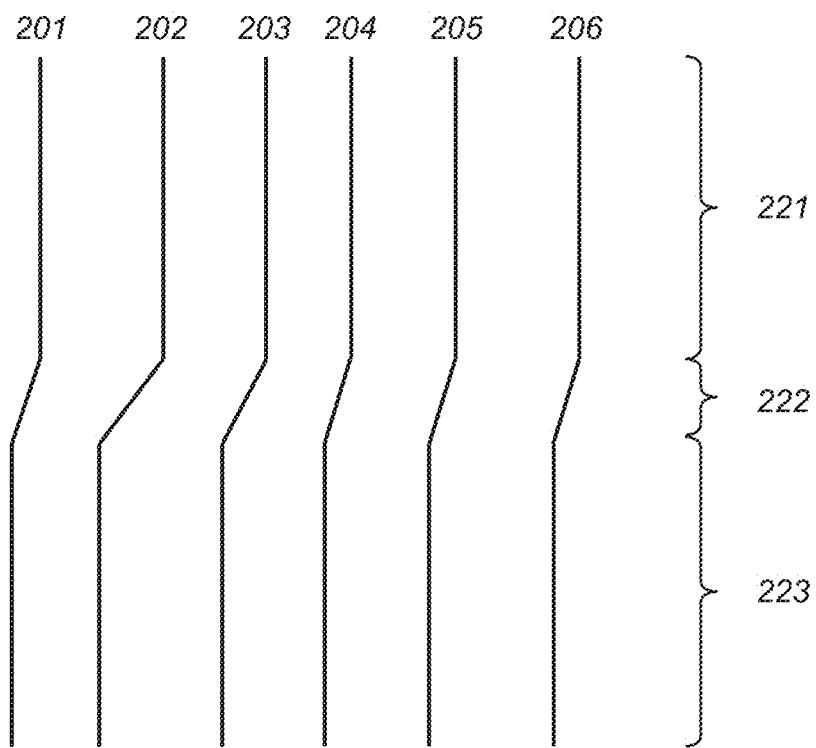

FIG. 2b schematically shows an example of an embodiment of a substrate. Shown are the main-lines 201-206. The main-lines have different parts in which the line-gap may vary differently. For example, the parts or regions of the main-lines may extend across the substrate in the second-direction. Show in FIG. 2b are two parts: part 221 and part 223. As drawn in FIG. 2b, in part 221, the line gaps are proportional to: 11, 9, 7, 9, 11, but in part 223, the line gaps are proportional to: 7, 11, 9, 9, 11. The line-gap between two subsequent main-lines thus changes in this example in the first direction as well, as in the second direction. Between the first part 221 and the second part 223 there is a connecting part 222 in which the main-lines of the two-parts are connected. The line-gaps in part 221 are selected according to an alternating pattern of increasing and decreasing line-gaps. The line-gaps in part 223 were selected randomly.

For example, in an embodiment, the line-gaps alternate between increasing towards a maximum distance and decreasing towards a minimum distance. For example, one may increase, e.g., with predetermined or with randomized amounts until maximum distance is reached after which the line-gap is reduced in a similar manner, e.g., until a minimum line-gap is reached. Below various strategies are given to ensure that the line-gap varies globally.

For example, in an embodiment, line-gaps are increased by 3% until a maximum value is reached, e.g., a maximum of 20% extra compared to an initial value.

For example, if $x_i$ are line gaps, and $x_0$ is an initial line-gap, then one may have $x_{i+1}=x_i*1.03$ until $x_i>1.2*x_0$. After that point, the line-gaps can decrease in the same patterns or with the same percentage, or the values may be reset and the pattern is started over, etc.

For example, in an embodiment, line-gaps are alternatingly increased and decreased by a percentage of the previous value, e.g., by 7%. The spacing may be reset if spacing is less than some value below the initial value, e.g., 10 micrometer. For example, one may alternate between the rules $x_{i+1}=1.07*x_i$ and $x_{i+1}=0.93*x_i$ until a point is reached where $x_i<x_0\_10$. After that point, the line-gaps can decrease in the same patterns or with the same percentage. The values may be modified.

Yet another option is to alternate increasing and decreasing but with an amount that depends on the difference with the initial value. For example, one may set $x_{i+1}=\alpha(x_i-x_0)$. Also here, the line-gap may be reset if it exceeds a maximum or minimum value. One may alternate between values of $\alpha$ that are above or below 1; for example, one may use $x_{i+1}=\alpha_i(x_i-x_0)$, wherein even indices i use an $\alpha_i>1$ and odd indices an $\alpha_i<1$.

Yet another option is to alternate between high and low values of the line gap. For example, high values could be selected at random from a high range, and low values could be selected from a low range. The high and low range may be distinct or may partially overlap.

The line-gaps may be varied randomly. For example, fully random, or random with additional criteria, e.g., alternating between high and low line-gaps. For example, odd numbered line-gaps may be drawn from a different probability distribution than even numbered line-gaps. The two distributions having a different high and low expected value, e.g., the higher may be at least 10% or 20%, etc., higher than the lower expectation.

When line-gaps are selected or modified randomly, then still additional criteria may be satisfied. Above, it was mentioned to enforce a maximum and minimum line-gap. Another advantageous criterion that may be enforced is that the sum of the line-gaps lies between a minimum and maximum total distance. This has the advantage that the connecting part 222 remains controlled. This may be obtained by drawing from the joint distribution conditioned on the desired criteria. This may also be obtained, for example, by first selecting randomly, and then modifying the random selection until constraints are met.

For example, in an embodiment one may select line-gaps $x_i$, where $min_x \leq x_i \leq max_x$, and $min_s \leq \Sigma x_i \leq max_s$, in which $min_x$, $max_x$, $min_s$, $max_s$, are bounds on the line-gaps and the sum of the line-gaps. The line-gaps may be varied in a predetermined pattern, e.g., as proposed above, or randomly, e.g., drawn from one or more distributions.

Figure 2C:
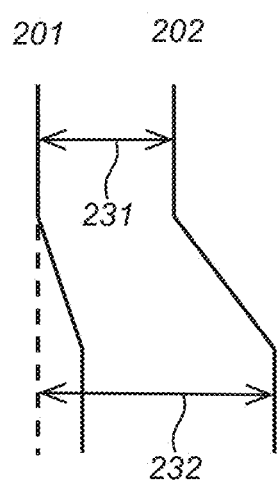

Line-gaps may be varied in the first direction as well as in the second direction. In this case, the variations may be controlled in order to control the shape of the connecting part. For example, FIG. 2c schematically shows an example of an embodiment of a substrate. Shown are two main-lines 201 and 202. At the top of FIG. 2c there is a line-gap 231. The line-gap has changed at the bottom of FIG. 2c. Main-line 201 is dashed to show how it would continue if no shift had occurred. Distance 232 is the distance between dashed main-line 201 and main-line 202 after the shift at the bottom of the figure. By keeping the percentage increase or decrease of distance 232 compared to line-gap 231 below a threshold the connecting part is controlled, e.g., from becoming too steep. For example, in an embodiment, the distance 232 is less than 1.35 times the line-gap 231. The change in line-gap may be controlled as well. Instead (or in addition) of controlling the size of the line-gaps, the angle that the connecting parts in the main-lines make, e.g., the connecting parts in lines 201 and 202, etc., can be controlled, e.g., that angle should be below a threshold, to avoid that the line becomes very steep. Another way to control this is to verify that subsequent connecting parts, do not become too close to each other.

Simulation experiments have confirmed that varying the line-gap is advantageous to reduce diffraction compared to a constant line gap. It has become clear that randomness in the line gap works well to reduce the diffraction effect. Although gradient pattern within the line gaps may reduce diffraction this does not work as well as more randomized changing in the line-gap. For example, diffraction is reduced most if the line gap alternates between random low and random high values. The diffraction effect can be suppressed further by the branches.

Selecting an efficacious electrode pattern may be computer implemented. For example, one may automatically generate a large number of electrode patterns, and compute for them a diffraction parameter that is indicative for the severity of the diffraction effect. Possibly other parameter may also be computed, e.g., a homogeneity parameter that indicates the homogeneity of the electric field. Among the generated electrode patterns, one may select an efficacious one based on the computer parameter(s).

Figure 3:
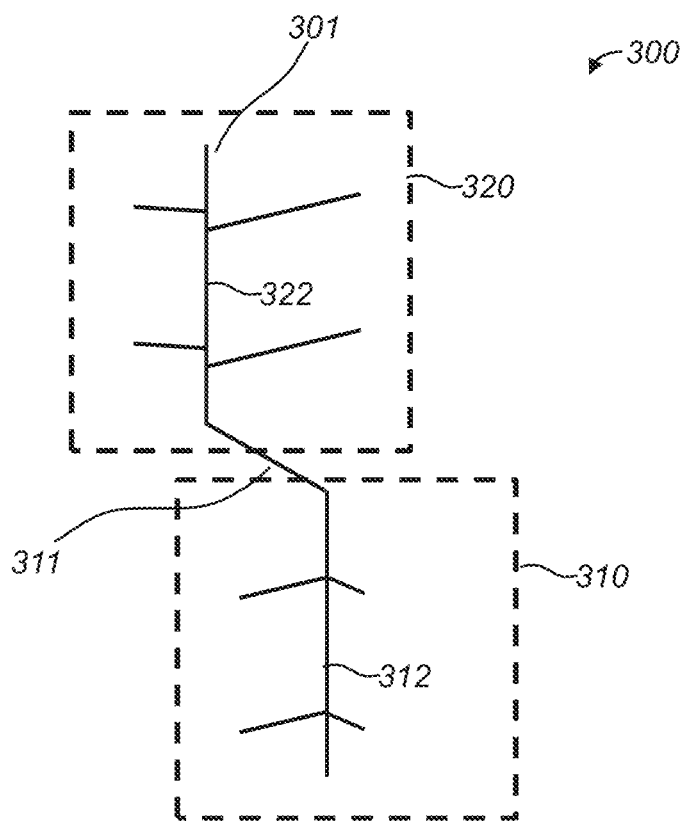

FIG. 3 schematically shows an example of an embodiment of a substrate 300. Shown in FIG. 3 is a main line which is built up as a connected series of sub main-lines from which branches extend. The sub main-line may correspond to the parts mentioned with reference to FIG. 2*b*, but this is not necessary. For example, a part as in FIG. 2*b* may comprise multiple sub main-lines.

Shown in FIG. 3 is a main-line 301 which comprises two sub main-lines 322 and 312 and a connecting part 311. Dashed boxes 320 and 310 show a sub main-line together with a number of branches. Such a box may be select as a unit, e.g., repeated as a unit, or selected from multiple units, e.g. randomly, etc.

An advantage of the modular design of FIG. 3 is that many parameters of the branches can be selected simultaneously. For example, the branches extending on a same side of the sub main-line may be of equal length, and branches extending on a same side of the sub main-line may be parallel. Moreover, the number of branches extending from either side of the sub main-line may be equal. These selections make selecting a more effective design easier, as fewer parameters need to be controlled. For example, a sub main-line and its branches that have been selected at one place may be repeated elsewhere.

On the other hand, the design of FIG. 3 still allows significant variations. For example, the branches extending on a same side of a sub main-line and branches extending from a subsequent sub main-line of the same main-line may have a different length and make a different angle with the first direction. Both options are shown in FIG. 3. Different sub main-lines may also have a different number of branches extending from the side of the sub main-line; this is not shown in FIG. 3. The angle between a branch and the first direction in a main-line or sub main-line may be randomly selected between a minimum and a maximum angle, e.g., between 45 and 90 degrees, etc. Note that sub main-line 322 and sub main-line 312 are shifted with respect to each other in both the first direction and in the second direction. Fixing some parameters in the dashed boxes, significantly reduces selection effort without having a high impact on the attainable results.

In an embodiment, line width may be selected in a range of about 1-50 micrometer. The line gaps may be selected from a range of about 40-100000 micrometer. The length of the sub-main lines, e.g., in FIG. 3, or the parts, e.g., in FIG. 2*b* may be related to the line-gap. For example, one may select their length, e.g., measured in the first direction as between 5 and 10 times the line-gap. In general, different values are possible, but these choices proved efficient. FIGS. 2*a*-2*c* do not show branches, but these may be present as in an embodiment. The number of branches in a sub-main line or part may be varied as well, e.g., from 3 to 10.

Varying line-gaps without branches also reduce the diffraction effect, but combining these options is better. In fact, it is possible to create a substrate without using branches. An example of such a substrate is a substrate (100) for use in a smart glazing, wherein a first electrode (110) and a second electrode (120) are applied to a same side of the substrate, each of the first and second electrodes being arranged in a pattern across the substrate, the first electrode and the second electrode each comprise first and second multiples of main-lines (111-113, 121-123) extending across the substrate in a first direction (101), the first and second multiples of main-lines of the first and second electrode being arranged alternatingly with respect to each other on the substrate, wherein the distances between a main-line (201, 202, 203) and an adjacent or subsequent main-line (202, 203, 204) on the substrate of the first electrode (201, 203) and the second electrode (202, 204) varies in the second direction and/or in the first direction. This substrate has a reduced diffraction due to the varying line-gaps. The substrate may be combined with features described herein, in particular, those relating to varying line-gaps.

Figure 4A:
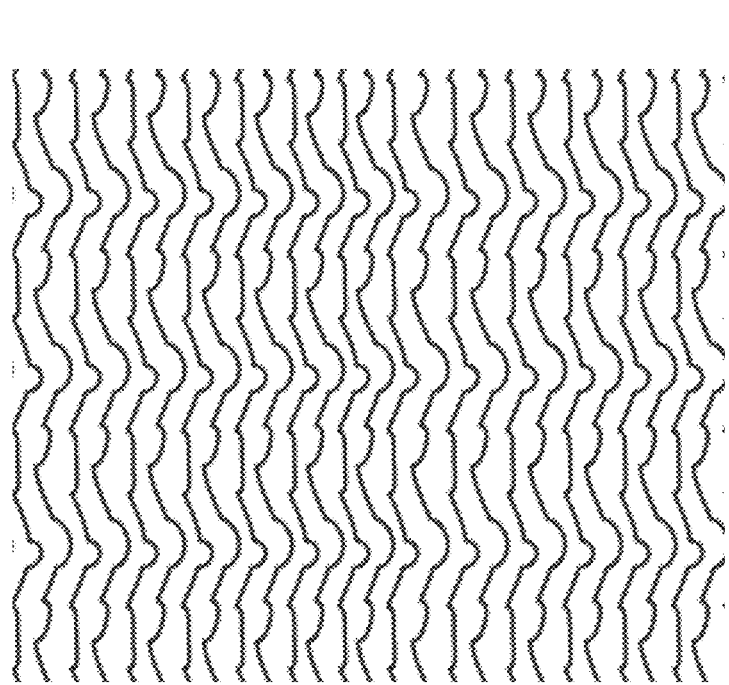
Figure 4B:
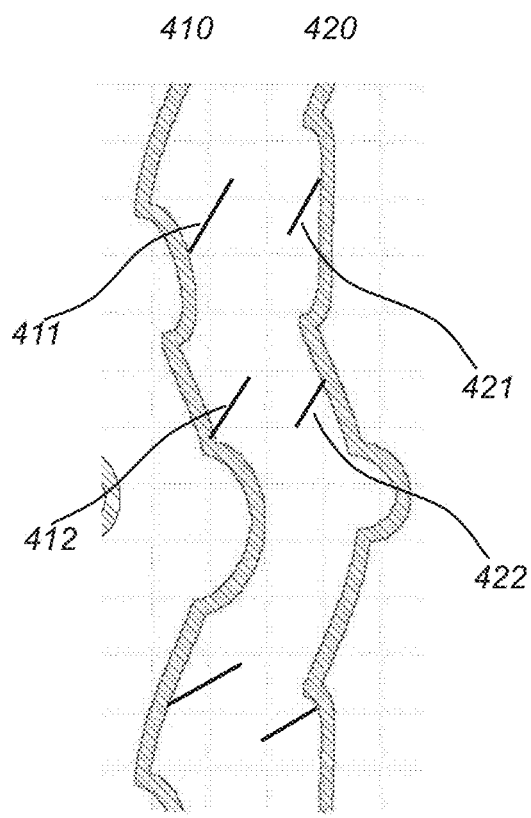

Most figures show a main-line which is straight or which is a combination of straight sub main-lines. This is however, not needed. For example, the man-line may be wavy, e.g., sinusoidal shape; for example as shown in PCT/EP2020/052379. FIG. 4*a* schematically shows an example of a substrate comprising multiple main-lines, but the main-lines are wavy. The main-lines are connected to two or more electrodes, e.g., as in FIG. 1*a* or 1*d*. The example of FIG. 4*a* does not comprise branches, but branches could be incorporated with wavy main-lines as well. In this situation, managing branches position, angles and lengths is more challenging as the distance between main-line is not fixed along the line. The increased ability to vary the design allows a further decrease in diffraction. FIG. 4*b* gives a schematic impression of a substrate in which branches are combined with non-straight, e.g., wavy main-lines. Branches do not need to be straight either.

When using wavy main-lines homogeneity may be increased and hot-spots may be decreased even without overlapping branches. An example of such a substrate is a substrate (100) for use in a smart glazing, wherein a first electrode (110) and a second electrode (120) are applied to a same side of the substrate, each of the first and second electrodes being arranged in a pattern across the substrate, the first electrode and the second electrode each comprise a multiple of main-lines (111-113, 121-123) extending across the substrate in a first direction (101), the multiple of main-lines of the first and second electrode being arranged alternatingly with respect to each other on the substrate, multiple-branches (131-134, 141-144) extending from the main-lines into the areas between the main-lines, the branches (142, 132, 141, 131) that extend into an area (150) between a first main-line (121) and a second main-line (112) of the first electrode and of the second electrode extending alternatingly from the first and second main-line, wherein one or more, or all of the main-lines are wavy.

Figure 4C:
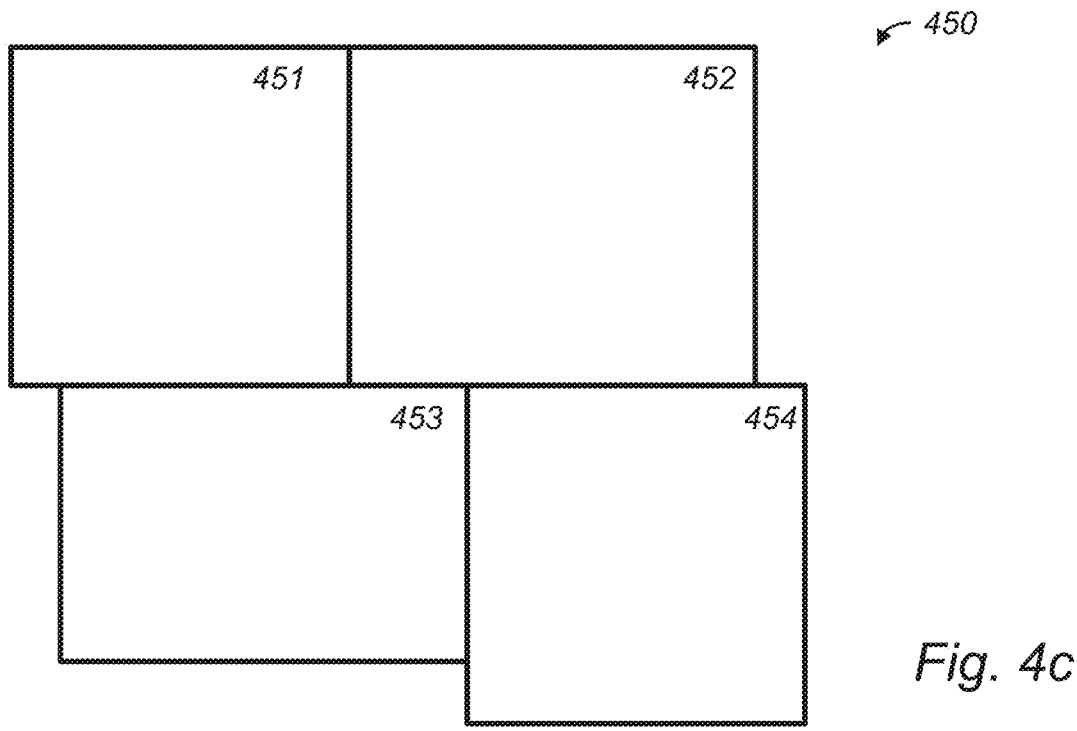

FIG. 4*c* schematically shows an example of an embodiment of a substrate 450, wherein the pattern in which the first and second electrodes are arranged is subdivided into a set of blocks extending across the substrate in the first and second direction. The blocks comprise part of an electrode pattern, so that the larger pattern is built up by combining the blocks. For example, each block may comprise multiple sub-lines of a part of the multiple main-lines of the first electrode and multiple sub-lines of a part of the multiple main-lines of the second electrode. A side of a block may be between, say, 1 mm and 10 mm. For example, a block may be 8 mm×8 mm.

The blocks may be laid out in some regular pattern, e.g., in a checkboard pattern, but an irregular pattern, e.g., as shown in FIG. 4c is also possible. The blocks may be rectangular. An advantage of using blocks is that an advantageous block, e.g., with a particularly low diffraction effect, and/or a particular good homogeneous electric field can be repeated multiple times on the substrate.

One or more of the blocks comprise a pattern according to an embodiment, but some blocks may comprise other patterns as well, e.g., a pattern without branches such as the one shown in FIG. 4a. Some of the main-lines in the block may be straight and some may be wavy. Some may have branches and some may not, etc.

Interestingly, working on the line shape at the micro level, e.g., as shown in various examples herein can impact parameters such as diffraction and homogeneity, but it is also possible to disturb the geometry of the design at larger scales and still have a significant optical impact. Therefore, it is possible to combine various electrode shapes produced as blocks at different levels. From a block construction point of view, the block can be created at different levels, e.g., at various level of randomization while increasing the pattern size. Practically, it is convenient if the number of lines in a block is a multiple of 2, although this is not necessary.

In an embodiment, the electrodes are driven with an electrical circuitry that supports a limited number of voltage sources, e.g., 4 voltage sources. In an embodiment, the number of voltage sources is equal to the number electrodes, which may be more than two on a given substrate. In an embodiment, the multiple lines on the substrate are divided over more than 2 electrodes, or even more than 4, or even many more. It is preferably, if the number of main-lines per electrode is substantially equal. For example, in an embodiment, multiple segments are arranged on the substrate, each segment being controlled by at least 2 electrodes for a substrate and at least 4 electrodes in an assembly of at least 2 substrates. Different optical effects can be arranged on the different segments by driving the corresponding electrodes. The fluid need not be constrained to one segment, although it could be If segments are isolated from each other, then a different fluid could be provided in them.

FIG. 5a schematically shows multiple examples of embodiments of substrates with electrode patterns according to an embodiment. The embodiments shown in FIG. 5a are all to scale, and can be extended to a full electrode pattern, e.g., following an interdigitated pattern.

FIG. 5b schematically shows an example of an embodiment of a substrate arranged for two or for three electrodes. The left of FIG. 5b indicates with the letters 'a' and 'b' which main lines belong to the same electrodes. All lines marked 'a' are connected electrically, although this is not shown in the detail of the electrode patterns shown in FIG. 5a or 5b; likewise for main-lines The right of FIG. 5b indicates with the letters 'a', 'b' and 'c' which main lines belong to the same electrodes. All lines marked with the same letter are connected electrically.

Figure 6A:
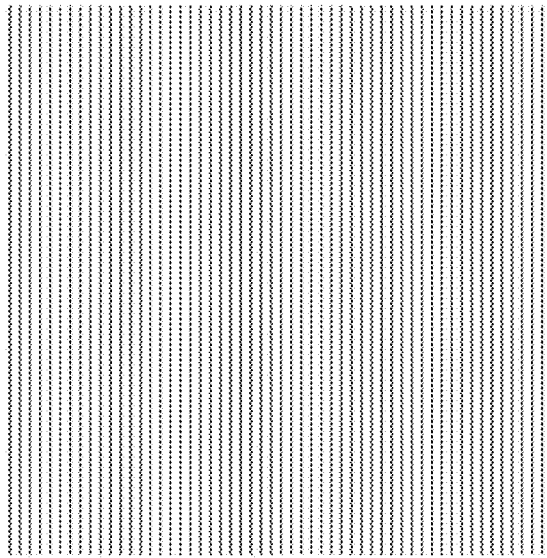
Figure 6B:
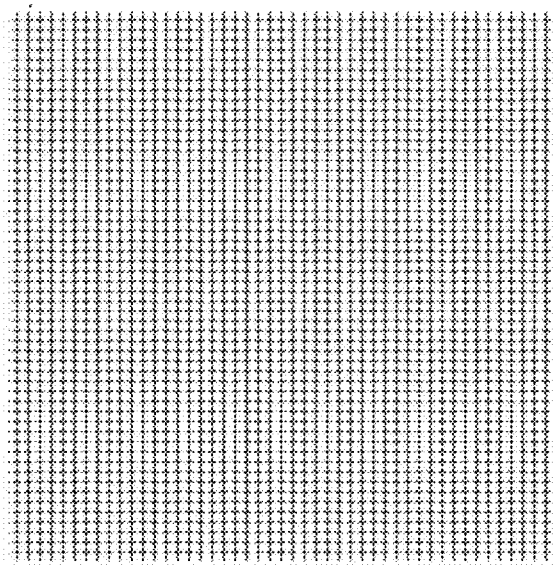
Figure 6C:
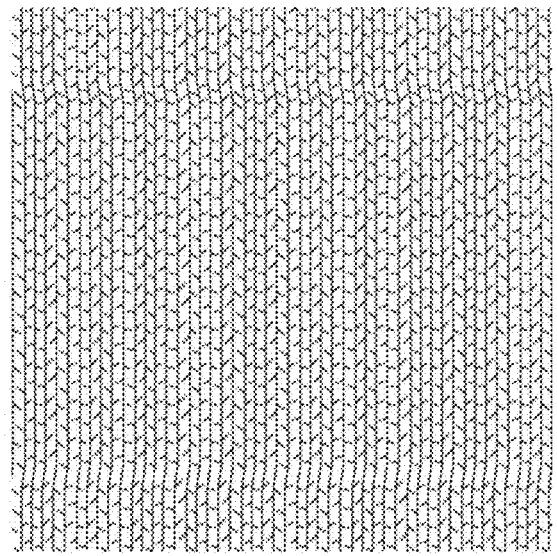
Figure 6D:
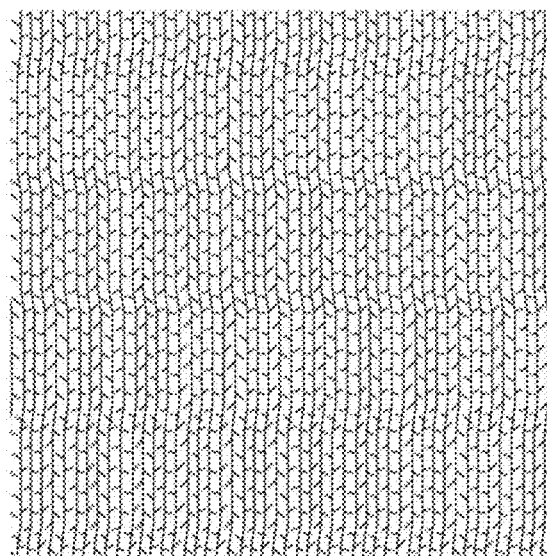

FIGS. 6a and 6b schematically show a comparative example of two substrates. FIGS. 6c-6d show examples of two embodiments. The diffraction pattern has been simulated. Simulating a diffraction pattern is known per se, in the art.

Diffraction level was calculated following the method cited in "Numerical comparison of grid pattern diffraction effects through measurement and modeling with OptiScan software" from Murray and al, published 20 May 2011 under SPIE journal (doi: 10.1117/12.883422). The method consists in calculating the power spectrum of an image representing the electrode pattern where electrodes are drawn black above a white background. From the raw power spectrum, the diffraction level is calculated as the ratio of the maximum intensity of the higher order diffraction by the intensity of the zero-order diffraction.

|  | Max diffraction Value (Simulation) | Line Width (um) | Line Gap (um) |
| --- | --- | --- | --- |
| FIG. 6a (straight lines) | 2.603 | 10 | 70 |
| FIG. 6b (open grid) | 3.792 | 10 | 80 |
| FIG. 4a | 0.540 | 10 | 70 |
| FIG. 6c | 0.629 | 10 | 70 |
| FIG. 6d | 0.377 | 10 | 70 |

FIG. 6a shows on the left a simple pattern consisting only of multiple straight main-lines. The main-lines are connected together in electrodes, e.g., two electrodes in an interdigitated pattern. The pattern of FIG. 6b has additional orthogonal straight lines orthogonal. Note that rotating the pattern will not help as it only rotates the diffraction pattern. FIGS. 6c and 6d schematically show an example of an embodiment of a substrate. FIG. 6c uses varying line-gaps and varying angles, and shifting sub main-lines. FIG. 6d uses a higher density block change, that is a higher number of vertical block along the lines. FIG. 6c shows 3 blocks, the mainline changing its direction 3 times. FIG. 6d has 10 blocks, its mainline changing its direction 10 times. Note that the maximum diffraction values for values 6c and 6d are much lower than for straight designs such as FIGS. 6a and 6b.

The patterns of FIG. 6b not only has unfavorable diffraction values, between opposing branches there is a tendency for hot-spots to occur. The electric field is much higher in the region between the tips of opposing branches than elsewhere. The result is a non-homogenous appearance in an opaque state and a non-uniform transition speed.

The wavy line design of FIG. 4a gives a similar value as the design of FIG. 6c, but it was found that branched designs are quicker and easier to make an advantageous selection. Moreover, branched designs provide a more homogenous electric field than wavy line designs do.

Two substrates according to an embodiment may be combined to form a light modulator. The light modulator is particularly suited to glazing. An exemplary embodiment of a light modulator is shown below.

Figure 7A:
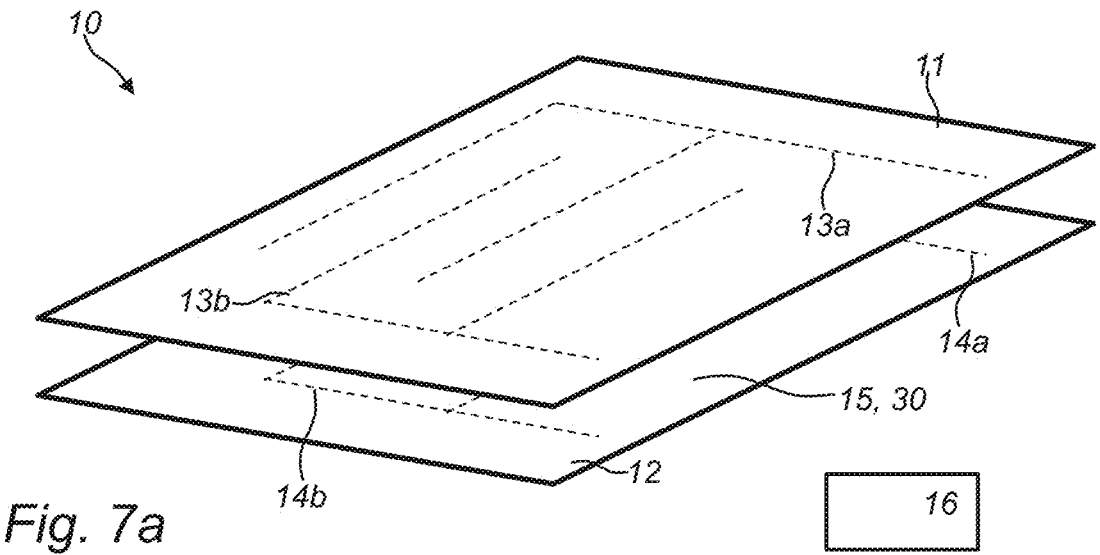

FIG. 7a schematically shows an embodiment of a light modulator 10, which may be applied in smart glazing.

Reference is made to patent application PCT/EP2020/052379, which is included herein by reference; this application comprises advantageous designs for light modulator, which may be further improved, e.g., by including electrodes and/or branches as explained herein.

Light modulator 10 can be switched electronically between a transparent state and a non-transparent state and vice versa, or between a reflective state and a non-reflective state and vice versa. Light modulator 10 comprises a first substrate 11 and a second substrate 12 arranged opposite to each other. On an inner-side of first substrate 11 at least two electrodes are applied: shown are electrodes 13a, 13b. These at least two electrodes are together referred to as electrodes 13. On an inner-side of second substrate 12 at least two electrodes are applied: shown are electrodes 14a, 14b. These at least two electrodes are together referred to as electrodes 14.

A fluid 15 is provided in between said substrate. The fluid comprises particles 30, e.g., nanoparticles and/or microparticles, wherein the particles are electrically charged or chargeable. For example, particles may carry a charge on their surface intrinsically. For example, the particle may be surrounded by a charged molecule.

The electrodes are arranged for driving particles 30 to move towards or away from electrodes, depending on the electric field applied. The optical properties, in particular the transparency or reflectivity of the light modulator depends on the location of particles 30 in the fluid. For example, a connection may be provided for applying an electro-magnetic field to the electrodes.

In an example, substrate 11 and substrate 12 may be optically transparent outside of the electrodes, typically >95% transparent at relevant wavelengths, such as >99% transparent. Taking electrodes into account, transparency can be much lower, e.g., 70%. The term "optical" may relate to wavelengths visible to a human eye (about 380 nm-about 750 nm), where applicable, and may relate to a broader range of wavelengths, including infrared (about 750 nm-1 µm) and ultraviolet (about 10 nm-380 nm), and sub-selections thereof, where applicable. In an exemplary embodiment of the light modulator a substrate material is selected from glass, and polymer.

In another example, one substrate, such as a bottom substrate 12, may be reflective or partially reflective, while the top substrate 11 is transparent. The optical properties, in particular the reflectivity of the light modulator depends on the location of particles 30 in the fluid. When the panel is in the open state (vertical drive), the particles will mostly be located between opposite electrodes of the two substrates, such that incident light can pass through the transparent top substrate and the optical layer relatively unhindered, and is reflected or partially reflected on the bottom substrate.

The distance between the first and second substrate is typically smaller than 30 µm, such as 15 µm. In an exemplary embodiment of the light modulator a distance between the first and second substrate is smaller than 500 µm, preferably smaller than 200 µm, preferably less than 100 µm, even more preferably less than 50 µm, such as less than 30 µm.

In an example the modulator may be provided in a flexible polymer, and the remainder of the device may be provided in glass. The glass may be rigid glass or flexible glass. If required, a protection layer may be provided on the substrate. If more than one color is provided, more than one layer of flexible polymer may be provided. The polymer may be polyethylene naphthalate (PEN), polyethylene terephthalate (PET) (optionally having a SiN layer), polyethylene (PE), etc. In a further example the device may be provided in at least one flexible polymer. As such the modulator may be attached to any surface, such as by using an adhesive.

Particles 30 may be adapted to absorb light and therewith preventing certain wavelengths from passing through. Particles 30 may reflect light; for example the reflecting may be specular, diffusive or in between. A particle may absorb some wavelengths, and reflect others. Particles may also or instead emit light, e.g., using phosphorescence, fluorescence, or the like. Even the fluid may emit light, which emittance is modulated by changing the location of particles.

In an exemplary embodiment of the light modulator a size of the nanoparticles is from 20-1000 nm, preferably 20-300 nm, more preferably smaller than 200 nm. In an exemplary embodiment of the light modulator the nanoparticles/microparticles may comprise a coating on a pigment, and preferably comprising a core. In an exemplary embodiment of the light modulator the coating of the particles is made from a material selected from conducting and semi-conducting materials.

In an exemplary embodiment of the light modulator the particles are adapted to absorb light with a wavelength of 10 nm-1 mm, such as 400-800 nm, 700 nm-1 µm, and 10-400 nm, and/or are adapted to absorb a part of the light with a wavelength-range falling within 10 nm-1 mm (filter), and combinations thereof.

In an exemplary embodiment of the light modulator the particles are electrically charged or chargeable. For example, a charge on the particles may be 0.1 e to 10 e per particle ($5*10^{-7}$–0.1 C/m2).

In an exemplary embodiment of the light modulator the fluid is present in an amount of 1-1000 g/m2, preferably 2-75 g/m2, more preferably 20-50 g/m2, such as 30-40 g/m2. It is a big advantage that with the present layout much less fluid, and likewise particles, can be used.

In an exemplary embodiment of the light modulator the particles are present in an amount of 0.01-70 g/m2, preferably 0.02-10 g/m2, such as 0.1–3 g/m2.

In an exemplary embodiment of the light modulator the particles have a color selected from cyan, magenta, and yellow, and from black and white, and combinations thereof.

In an exemplary embodiment of the light modulator the fluid comprises one or more of a surfactant, an emulsifier, a polar compound, and a compound capable of forming a hydrogen bond.

Fluid 15 may be an apolar fluid with a dielectric constant less than 15. In an exemplary embodiment of the light modulator the fluid has a relative permittivity εr of less than 100, preferably less than 10, such as less than 5. In an exemplary embodiment of the light modulator, fluid 15 has a dynamic viscosity of above 10 mPa·s.

Electrodes 13a, 13b and electrodes 14a, 14b are in fluidic contact with the fluid. The fluid may be in direct contact the electrodes, or indirectly, e.g., the fluid may contact a second medium with the electrode, such as through a porous layer. In an embodiment, the electrodes cover about 1-30% of the substrate surface. In an embodiment, the electrodes comprise an electrically conducting material with a resistivity of less than 100 nΩm (at 273K; for comparison typically used ITO has 105 nΩm), which is similar to an electrical conductivity $>1*10^7$ S/m at 20° C.). In an embodiment of the light modulator electrodes comprise copper, silver, gold, aluminum, graphene, titanium, indium, and combinations thereof, preferably copper. The electrodes may be in the form of micro wires embedded in a polymer-based substrate; for example, copper micro wires.

A connection for applying an electro-magnetic field to the electrodes, wherein the applied electro-magnetic field to the electrodes provides movement of the nano- and microparticles from a first electrode to a second electrode and vice versa. A connection for applying an electro-magnetic field to the electrodes may be provided. For example, in an exemplary embodiment of the light modulator an electrical current is between −100-+100 µA, preferably −30-+30 µA, more preferably −25-+25 µA. For example, a power provider may be in electrical connection with the at least two electrodes. The power provider may be adapted to provide a waveform power. At least one of amplitude, frequency, and phase may be adaptable to provide different states in the light modulator. For example, the aspects of the power may be adapted by a controller.

Light modulator 10 may comprise one or more segments, a segment being a single optically switchable entity, which may vary in size. The substrates enclose a volume, which may be a segment, at least partly.

The present device may comprise a driver circuit for changing appearance of (individual) segments by applying an electro-magnetic field. As such also the appearance of the light modulator, or one or more parts thereof, may be changed. For example, a segment may have an area of at least 1 mm$^2$. The present design allows for stacking to allow for more colors; e.g., for full color applications a stack of two or three modulators could provide most or all colors, respectively.

Having one or more segments allows the light modulator to be controlled locally; this is advantageous for some applications, but not necessary. For smart glazing a light modulator may be used with or without segments. For example, applied in smart glazing, transparency or reflectivity may be controlled locally, e.g., to block a sun-patch without reducing transparency or reflectivity in the whole window. Segments may be relatively large, e.g., having a diameter of at least 1 mm, or at least 1 cm, etc.

In an exemplary embodiment of the light modulator substrates (11,12) are aligned, and/or electrodes (13,14) are aligned. For example, electrodes 13a, 13b and electrodes 14a, 14b may be aligned to be opposite each other. In aligned substrates, electrodes on different substrates fall behind each other when viewed in a direction orthogonal to the substrates. When the light modulator is disassembled, and the substrates are both arranged with electrodes face-up, then the electrode patterns are each other's mirror image.

Aligning substrates may increase the maximum transparency or reflectivity of the light modulator, on the other hand when selecting a light modulator for more criteria than the range of transparency or reflectivity, etc., it may be better to not to align or not fully align the two substrates. Light modulators can be stacked. For example, two stacked light modulators can be made from three substrates, wherein the middles one has electrodes on both its surfaces. In an embodiment of the light modulator optionally at least one substrate 11,12 of a first light modulator is the same as a substrate 11,12 of at least one second light modulator. Also for stacked modulators, alignment may increase maximum transparency or reflectivity, but is may detrimental to other considerations, e.g., diffractions.

Figure 7B:
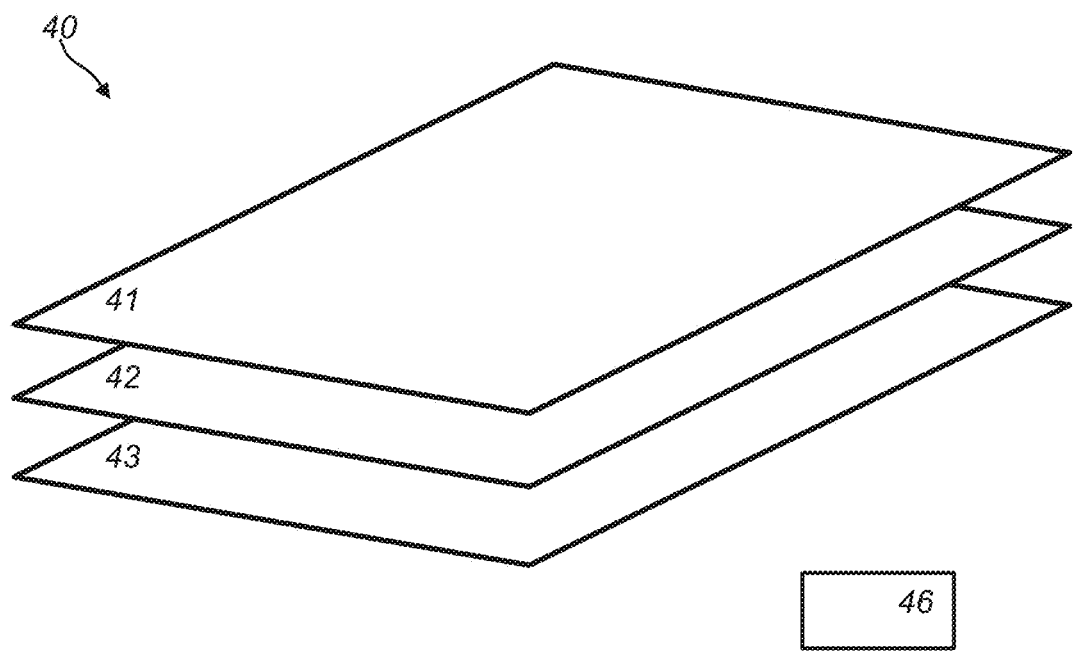

FIG. 7b schematically shows an example of an embodiment of a light modulator 40. Light modulator 40 is similar to light modulator 10, except that it comprises multiple optical layers; in the example as shown two optical layers. There may be more than two optical layers. Each optical layer is arranged between two substrates. Light modulator 40 can be regarded as a stack of two-substrate light modulators as in FIG. 7a. As shown, light modulator 40 comprises three substrates: first substrate 41, second substrate 42 and third substrate 43. Between substrates 41 and 42 is an optical layer, and between substrates 42 and 43 is an optical layer. The optical layers may be similar to those in light modulator 10. A controller 46 is configured to control electrical current on the electrodes of the substrates. For example, in FIG. 7b, controller 46 may be electrically connected to at least 4 times 2 equals 8 electrodes.

Interestingly, the particles in the multiple optical layers may be different so that the multiple layers may be used to control more optical properties of the light modulator. For example, particles in different optical layers may absorb or reflect at different wavelengths, e.g., may have a different color. This can be used to create different colors and/or different color intensities on the panel by controller 46. For example, a four-substrate panel may have three optical layers with different color particles, e.g., cyan, yellow and magenta, respectively. By controlling the transparency or reflectivity for the different colors a wide color spectrum may be created.

The surfaces of the substrates that face another substrate may be supplied with two or more patterns, e.g., as in an embodiment. For example, the outer substrates 41 and 43 may receive electrodes only on an inner side, while the inner substrate, e.g., substrate 42, may have electrodes on both sides.

Substrates 41 and 42 may together be regarded as an embodiment of a light modulator. Likewise, substrates 42 and 43 may together be regarded as an embodiment of a light modulator.

Figure 7C:
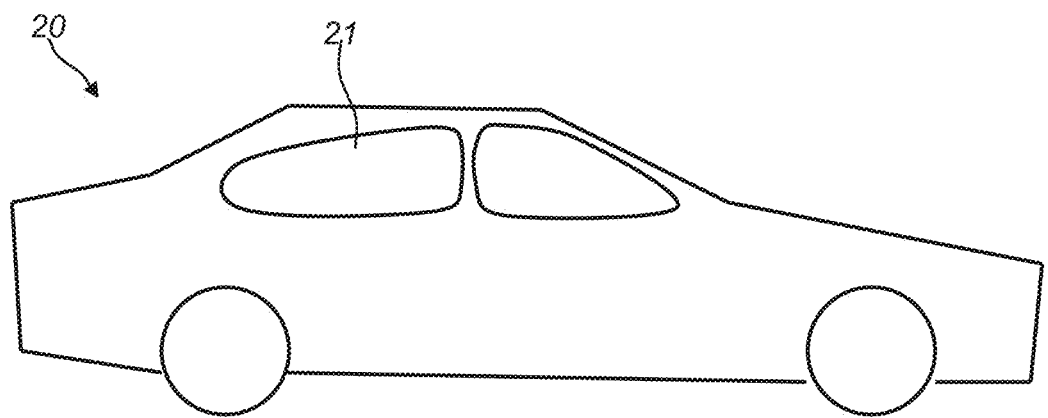

FIG. 7c schematically shows an example of an embodiment of a car 20 having smart glazing for windows 21. This is a particularly advantageous embodiment, since while driving the level of incident lighting can change often and rapidly. Using smart glazing in a car has the advantage that light levels can be maintained as a constant level by adjusting the transparency of the car windows. Moreover, the reduced diffraction effect improves safety as it reduces driver distraction. Car 20 may comprise a controller configured for controlling the transparency or reflectivity of windows 21.

The smart glazing can also be used in other glazing applications, especially, were the amount of incident light is variable, e.g., buildings, offices, houses, green houses, skylights. Skylights are windows arranged in the ceiling to allow sunlight to enter the room.

Figure 8A:
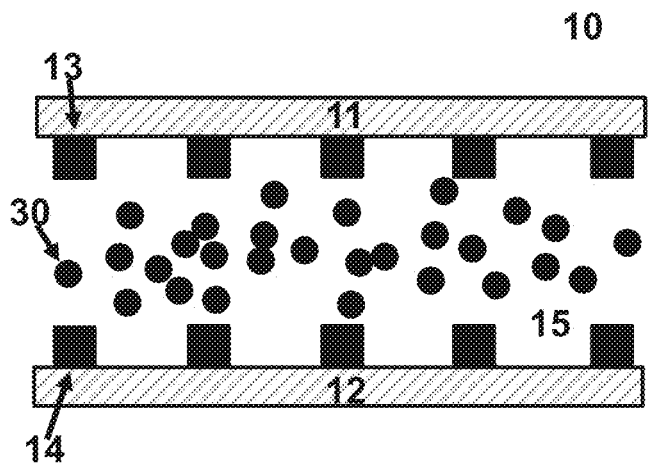
Figure 8B:
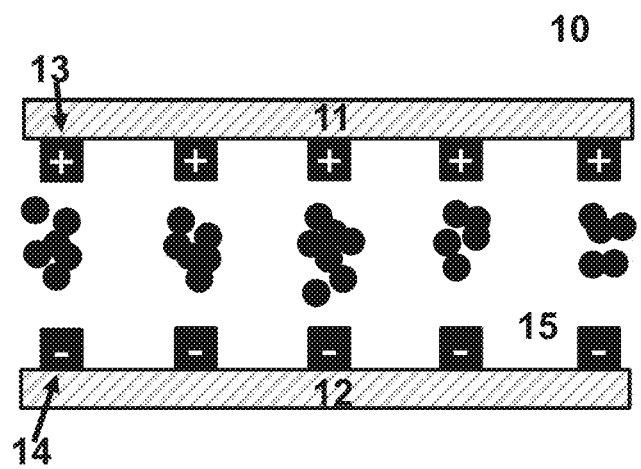

FIGS. 8a-8b schematically show a side view of an embodiment of a light modulator in use. Applying an electric field to the electrodes on the substrates causes an electrical force on the particles. Using this effect, the particles can be moved around and so different transparency or reflectivity states can be caused in the light modulator. A controller may control the electric field, e.g., its amplitude, frequency, and phase. In an embodiment, the controller is connected to at least four electrodes: two for each substrate. But more electrodes may be used and connected to the controller; for example, more than 2 electrodes may be used for a substrate to better fine tune grey scaling, and driving to non-transparent or non-reflective state. Multiple electrodes may also be used to support multiple segments on the substrate.

FIG. 8a shows the light modulator without an electric field being applied. No electric force is yet applied on particles 30 suspended in fluid 15, in FIG. 8a.

In the configuration shown in FIG. 8a, a conducting electrode pattern, arranged on the top substrate is completely or substantially aligned with a conducting electrode pattern on the bottom substrate. The conducting electrode pattern may be deposited on a transparent or (partially) reflective glass substrate or may be embedded in a plastics substrate, etc.

Alignment between the top-electrode pattern and the bottom electrode pattern contributes to a wider range of achievable levels of transparency or reflectivity. However, alignment is not needed, as similar effects can be obtained without alignment. Without alignment, a range of transparency or reflectivity is likewise obtained.

Note that in these examples, reference is made to the top substrate and the bottom substrate to refer to substrate that is higher or lower on the page. The same substrates could also be referred to, e.g., as the front substrate and back substrate, since in a glazing application, the substrates would be aligned vertically rather than horizontally.

FIG. 8b shows the light modulator wherein, say at an instance P1, a potential +V1 is applied to each micro wire electrode on the top substrate, while a negative voltage, say −V1, is applied to each micro wire electrode of the bottom substrate. Thus, in this case, the same positive potential is applied to all electrodes 13, and the same negative potential is applied to electrodes 14. The difference in potential causes negatively charged particles to flow to the vicinity of the electrodes of the top substrate, where the particles will substantially align with the top electrodes. As a result, if both the top and bottom substrate are transparent, the transparency of light modulator 10 will increase. Likewise, if e.g. the top substrate is transparent and the bottom substrate is reflective, the reflectivity of light modulator 10 will increase If the solution contains positively charged particles they will flow to the vicinity of the electrodes of the bottom substrate, where those particles will substantially align with the bottom electrodes.

A similar transparency or reflectivity can be achieved, when in a second instance, P2, of the on-state, the voltages of the top electrodes and bottom electrodes are reversed in contrast to the instance of P1. In the instance P2, the voltage of each electrode on of the top substrate are now supplied with a negative potential −V1 while the voltages of the aligned electrodes of the bottom substrate are supplied with a positive potential. This state is similar to the state shown in FIG. 8b, but with top and bottom substrates reversed. Also in this configuration the transparency or reflectivity of light modulator 10 is high.

Interestingly, by switching between a positive potential at electrodes at the top substrate, e.g., as shown as electrodes 13 in FIG. 8b (and a negative potential on electrodes 14), and a positive potential at electrodes at the bottom substrate, e.g. as shown as electrodes 14 in FIG. 8b, the transparency or reflectivity can be maintained, while decreasing corrosion damage to the electrodes. This alternating electric field can be achieved by applying alternating electric potentials to the top and bottom electrodes.

Applying a waveform is optional, but it is a useful measure to increase the lifetime of the light modulator by reducing corrosion. Corrosion can form for example, when using copper electrodes, since, copper ions dissolve in an ionic fluid at one substrate and flow to electrode on the opposite substrate, where they deposit. By applying a waveform the direction of copper ion transport is frequently reversed, thus reducing corrosion damage. Between the two instances P1 and P2 the corrosion current between the two substrates is balanced or substantially, e.g., >95%, balanced, e.g., as corrosion rate of an electrode of the top plate occurs there is a balancing deposition of copper on the bottom electrode between each instance of time, P1 and vice versa in instance P2. Therefore, the particles are transitioning or migrating continuously between top and bottom electrode, and the light modulator or smart window is always in the on-state while the dynamic electrolysis current between the top and bottom electrode is constant thus there is no or a negligible net loss of electrode material on the top and bottom substrates.

Figure 8C:
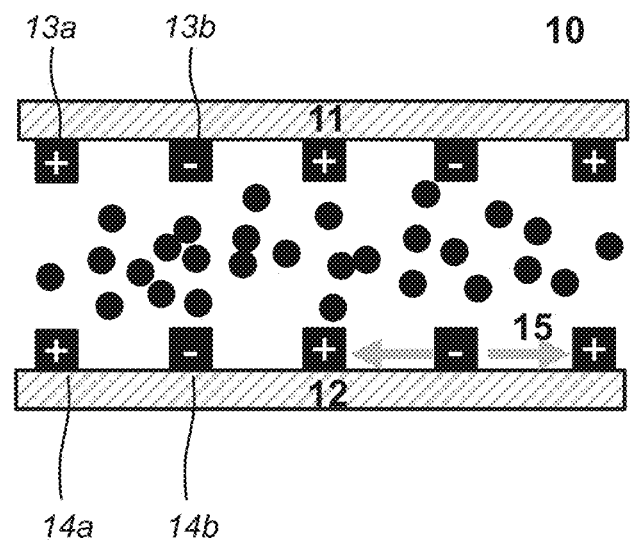

FIG. 8c shows how a state of decreased transparency or reflectivity can be obtained. An alternating voltage is applied on the same substrate. For example, in an embodiment a potential +V2 is applied a first electrode and the next immediate neighboring electrode has an opposite potential −V2 etc., as shown in FIG. 8c. This can be obtained by applying the potential +V2 to electrode 13a and the opposite potential −V2 to electrode 13b. On the opposite substrate the potential +V2 may be applied to electrode 14a and the opposite potential −V2 to electrode 14b. For example, the electrodes may be arranged so that the electrodes on the substrates are aligned; a electrode on the top substrate having an opposite electrode on the bottom substrate, and vice versa. For example, to decrease transparency or reflectivity, the opposite electrode may receive the same potential, while neighboring electrodes receive an opposite potential. An embodiment is shown in FIG. 8c, wherein four electrodes are indicated with the reference numbers 13a, 13b, 14a and 14b, and the rest of the electrodes continue to alternate.

By using this AC drive cycle between top and bottom substrates, diagonal and lateral electric fields are generated between the two substrates thereby causing haphazard diffusion of the particles thereby creating the closed state of the light modulator. As a result of this configuration, the particles migrate diagonally and laterally between the top and bottom substrate and diffusion of particles into the visible aperture of the light modulator contributes to the closed, opaque state of the light modulator.

As for the transparent state shown in FIG. 8b, a waveform may be applied to the electrodes, e.g., so that electrodes that are shown in FIG. 8b with a positive potential become negative and vice versa. As in FIG. 8b applying a waveform, e.g., between electrodes 13a and 13b and between 14a and 14b reduces corrosion damage to the electrodes.

The AC drive cycle may be implemented by using an interdigitated line configuration combining the top and bottom electrode configuration shown in plan view in FIGS. 5, 6a-6d, etc.

The extent with which transparency or reflectivity is increased or decreased in FIGS. 8b and 8c depends on the voltage and frequencies difference. By varying the voltage difference, the amount by which the transparency or reflectivity increases, respectively, decreases, is controlled. For example, a curve representing light transmission versus voltage may be determined, e.g., measured. To obtain a particular level of light transmission, e.g., a particular transparency, e.g., a particular grey-scale level, the corresponding voltage, e.g., AC voltage may be applied. By interpolating the signals for a transparent or for a non-transparent state, levels in between transparent and non-transparent may be obtained. Likewise, a curve representing light reflection versus voltage may be determined, e.g., measured. To obtain a particular level of reflectivity, the corresponding voltage, e.g., AC voltage may be applied. By interpolating the signals for a reflective or for a non-reflective state, levels in between reflective and non-reflective may be obtained.

Different electrode patterns may be used, for a light modulator. The electrode patterns may each provide a range of greyscales, e.g., levels of transparency or reflectivity, that the light modulator can attain. However, the particular range of greyscale for any particular electrode pattern may be different from another electrode pattern. In other words, although different patterns give an increased transparency or reflectivity or an increased opacity, the exact response to a drive signal depends on many factors, including the particular pattern that is used. The variations in the optical properties of a light modulator may have a fine resolution, e.g., below 1 mm. Note that no pixilation of the light modulator is needed to achieve different optical patterns, e.g., logos, visible in the light modulator.

This effect may be used to embed visible images in the light modulator by locally changing the electrode pattern on the substrates of a light modulator. For example, one may locally have greyscales that have a permanent off-set in greyscale relative to each other, because of a different electrode pattern. For example, by locally changing the electrode pattern or its pitch, the maximum transparency or reflectivity can be altered.

The result is an area on the light modulator which has a different intensity of greyscale, e.g., a different greyscale, or of coloring. The area may have the same color-point, though. In an embodiment, they may switch together with the rest of the window, although at a different rate. For example, even if the same voltage is applied to the electrodes in two different areas, they cause a different transparency state, e.g., different transmission level, due to different electrode patterns. For example, a curve representing transmission versus voltage may be shifted. For example, if voltage control is changed in the same way in both areas then in both areas light transmission may change, but with a different amount. An area may also be made less response to a drive signal by reducing the density of electrodes; in particular, an area may be made not to switch at all, e.g., by not applying electrodes in the area.

This effect may be used to embed logos in a light modulator. For example, FIG. 9a schematically shows an example of an embodiment of a logo and a grid. As shown in FIG. 9a, a first set of grid squares intersects with the logo and second set of grid squares does not intersect with the logo. For intersecting first set a different electrode pattern may be used than for second set of grid squares. FIG. 9b schematically shows an example of an embodiment of a substrate. At areas indicated by the first grid squares a different electrode pattern may be embedded in the first and second substrates, e.g., substrates such as in FIG. 7a, than at areas indicated by the second grid squares. As shown in FIG. 9b, the two areas have a different transmission.

FIG. 9c-d schematically show an example of an embodiment of a light modulator. Shown in FIG. 9c the substrate is in a non-transparent configuration; at an area indicated by the logo the electrode pattern is adapted so that it provides less efficient darkening of the light modulator. Shown in FIG. 9d the same substrate is in a more transparent configuration. Note that transmission increased in both the logo-area and the non-logo area, although at a different rate. The area indicated by the logo is still visible in FIG. 9d, even though the transmission in these areas is now closer to each other.

Interestingly, the effect may be achieved merely by different patterning, e.g., by changing the pitch and/or design of the electrodes. Changing the waveform/current/voltage/power to this area compared to another area is not needed.

Embedding an image in a light modulator in particular in smart glazing has many applications. For example, content may be embedded, such as a logo, a brand, etc. Textures may be embedded in the glazing. A contrast gradient may be embedded in glazing. Other options include emergency exit signals like arrows, etc.

For example, in the windows of shops/restaurants: full black windows may indicate that the shop is closed, whereas the logo or any other designated design is visible when the shop is open. The pattern may be a logo or the like, but this is not necessary. The image that is embedded may be a pattern to prevent passers—by from looking inside the window while, still providing sufficient light inside. In particular, the embedded image does not need to contain a readable message. In a car windows, when the car is switched-off, e.g., parked, the glazing may be fully dark, while if the car is switched-on a logo appears, e.g., a logo of a manufacturer.

By adjusting design parameters a specific local optical difference compared to a background will be visible without a variation of electrical driving. Parameters of the electrode pattern that influence the optical performance include:

Electrode line gap
Electrode line thickness
Electrode line shapes
Electrode line directions
Local variation of cell gap, e.g., the distance between substrates
Distribution of branch lengths For example, electrode line gap, thickness, shape, directions act on the local transparency level and response time; Electrode line gap/width affects locally the diffraction level which could also enable specific local optical differences. Variation of cell gap will change the dark state level and consequently also maximum transparency or reflectivity and response times. Another option is to change the diffraction effect between two areas. For example, one area, e.g., the majority of the glazing, may have an electrode patterns with low diffraction effect, while the embedded image, may have an electrode pattern with a deliberate high diffraction effect.

Optical performance, including transparency or reflectivity may also be changed by changing the electrode materials; for example choosing electrode materials with different optical, and/or conductivity properties. Electrode materials may impact the light diffusion, reflection, and diffraction which may lead to additional optical effects. Electrode materials conductivity if changed locally will affect the potential at this location and therefore the electric field and consequently the transparency or reflectivity level.

For example, the electrode material may be copper, aluminum, gold, indium-tin oxide (ITO), etc. ITO is transparent while Cu/AI is reflective, thus using a different electrode material, a different appearance may be obtained, irrespective of the voltage driving. Likewise, different materials with a different resistance, will give rise to a different electric field. For example, ITO will have a smaller electric field, even though driven with the same voltage.

Another way to obtain variance in transparency or reflectivity is by locally varying spacers that may be applied between the first and second substrate. For example, different spacers may have different optical properties and densities. For example, one may use spacers that have different transparency, a different size. The density of spacers may be different. In an embodiment, the density of spacers may be increase even 1000×, which gives a marked different appearance. Smaller increases than 1000× are possible. Spacers may also be adapted to intentionally vary the distance between the substrates and thus its appearance.

The various options to locally change the appearance of an area of a light modulator without changing the driving in that area may be applied to light modulators with a single layer, e.g., one fluid layer, e.g., two substrates; but also to multiple layer light modulators, with multiple fluid-layers, and more than two substrates. The latter may be used to generate multiple colors.

The pattern in which the first and second electrodes are arranged is subdivided into multiple parts. There may be two parts, each with different optical properties, e.g., due to a different electrode pattern; there may also be multiple parts. For example, this may be used to apply an image with multiple levels of grey, instead of merely black and white.

To embed a logo it is not necessary to use a substrate according to an embodiment. For example, an advantageous substrate which may be used in smart glazing comprises a first electrode and a second electrode that are applied to a same side of the substrate. Each of the first and second electrodes is arranged in a pattern across the substrate, the first electrode and the second electrode each comprise a multiple of main-lines extending across the substrate in a first direction, the multiple of main-lines of the first and second electrode being arranged alternatingly with respect to each other on the substrate. The pattern in which the first and second electrodes are arranged is subdivided into multiple parts, at least one of: an electrode line gap, electrode line thickness, electrode material, electrode line shapes, electrode line directions, being different in the multiple parts causing a different maximum transparency or reflectivity or saturation.

Such a substrate with an embedded logo—with or without branches—or a light modulator that includes such substrates, may be combined other with features described herein.

FIG. 10 schematically shows an example of an embodiment of method for controlling a light modulator according to an embodiment. Method 500 may be computer implemented. Method 500 comprises

- selecting (510) an alternating current of one of multiple maximum amplitudes corresponding to one of a multiple levels of transparency in the light modulator,
- applying (520) the alternating current to the electrodes to obtain an electro-magnetic field between the electrodes providing electrophoretic movement of the particles towards or from an electrode.

Many different ways of executing the method are possible, as will be apparent to a person skilled in the art. For example, the order of the steps can be performed in the shown order, but the order of the steps can be varied or some steps may be executed in parallel. Moreover, in between steps other method steps may be inserted. The inserted steps may represent refinements of the method such as described herein, or may be unrelated to the method. For example, some steps may be executed, at least partially, in parallel. Moreover, a given step may not have finished completely before a next step is started.

Driving the electrodes may use a signal with a selected maximum amplitude, which corresponds to one of multiple levels of transparency or reflectivity in the light modulator. The signal may be alternating current or alternating voltage.

Embodiments of the method may be executed using software, which comprises instructions for causing a processor system to perform method 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 11A:
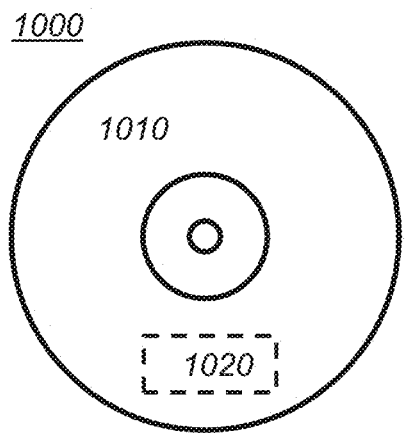

FIG. 11*a* shows a computer readable medium 1000 having a writable part 1010 comprising a computer program 1020, the computer program 1020 comprising instructions for causing a processor system to perform a light modulator method, according to an embodiment. For example, a processor system may be connected to a light modulator panel. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said light modulator method.

Figure 11B:
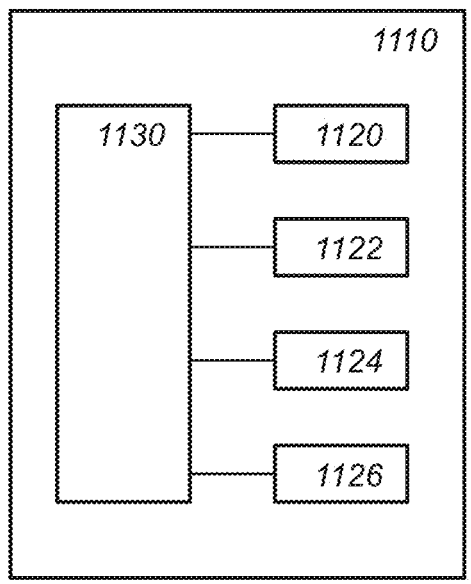

FIG. 11*b* shows in a schematic representation of a processor system 1140 according to an embodiment of a controller for a light modulator. The processor system comprises one or more integrated circuits 1110. The architecture of the one or more integrated circuits 1110 is schematically shown in FIG. 11*b*. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the device may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

A controller for a light modulator, e.g., to control voltages applied to electrodes may comprise a processor circuit, but may also or instead comprise a state machine.

FIG. 12-37 schematically show examples of embodiments of a light modulator. Within these figures voltages that may be applied on an electrode are indicated with voltage references V1, V2, . . . , to indicate that a voltage may be applied on that electrode. The voltage indicated by a different voltage reference are typically different, although they may also be equal. Driving the electrodes may use a signal with a selected maximum amplitude. Using different voltages, for one, or some or all electrodes will result in a visible difference in the panel, in particular, may result in a different optical properties, depending on the particular, e.g., a different transparency. For example, the signal amplitudes may be selected from multiple maximum amplitudes to achieve one of multiple transparencies. The signals may be alternating current or alternating voltage.

A plus or minus sign indicates that the voltage is plus or minus relative to a null-voltage. Another example of the same embodiment may be obtained by replacing all plus signs by minus and vice-versa.

As an example, the different voltages reference may be equal (apart from sign) except for a correction which is applied to account for manufacturing variations, e.g., slightly different electrodes, non-flat substrates, and so on. As an example, the different voltages reference may be different to create intermediate transparencies, e.g., different greys, or different colors or color intensities. As an example, intermediate voltages may be used to facilitate dispersing or collecting of particles. Although using different voltage references is advantageous, one still obtains an example of an advantageous light modulator by selecting all or some voltages references as equal (except for sign).

Typically, the electrodes are driven DC-neutral, e.g., by applying an AC signal to them. In that respect the voltage references may be regarded as maximum amplitudes of the AC signal, while the plus and minus signs indicate the phase of the signals.

The voltage sign (the plus/minus indication) is thus only for a specific period of time; the voltage sign for each electrode can be reversed for the next period of time. The figures are not fully to scale, for example, substrates electrodes are not necessarily equidistant. Arrows in the figures show the main electric field lines.

The figures show a light modulator comprising a first substrate and a second substrate, with an optical layer in between. Multiple electrodes are applied on their inner sides, that each comprise multiple of main-lines. In the figures, the first and second substrate will also be referred to as top and bottom for clarity. It is not noted though that the substrate may be in any position, so that top and bottom may be front and back for example. The electrodes in these figures do not show enhancements such as branches, although these may be applied.

A controller may be connected to the light modulators shown to control the voltage created on the electrodes, e.g., as indicated by the voltage references.

Notice is given that many of the improvements described herein, e.g., branches, having more than two electrodes on a substrate, and so on, are especially advantageous in combination; for example, branches reduce diffraction but this effect is enhanced when multiple electrodes reduce the curtain-effect. Nevertheless, these enhancements, as described below and elsewhere herein, are also advantageous indecently, e.g., without a controller configured to obtain one of a multiple levels of transparency or reflectivity in the light modulator by using an alternating current of one of multiple maximum amplitudes. Embodiments below may be adapted to a controller unable to drive with an alternating current of different maximum amplitudes, by choosing the voltages indicates by the voltage references equal.

FIGS. 12-15 schematically shows an example of embodiments of a light modulator having two electrodes applied on each substrate.

Having at least 4 independent electrodes, e.g., wires, in the device, arranged in at least 2 electrodes on each substrate, it is possible to modulate the electric field directions as indicated in the figures. As noted, it is possible to modulate the potential level for each electrode. A simplified light modulator is obtained by using single potential reference.

Figure 12:
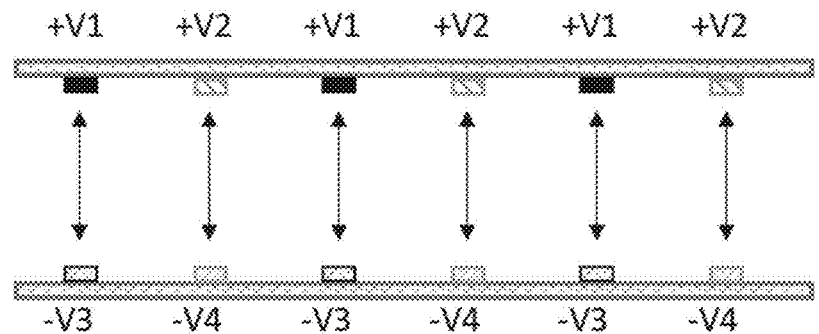

FIG. 12 shows an example of driving the light modulator to increase transparency.

Figure 13:
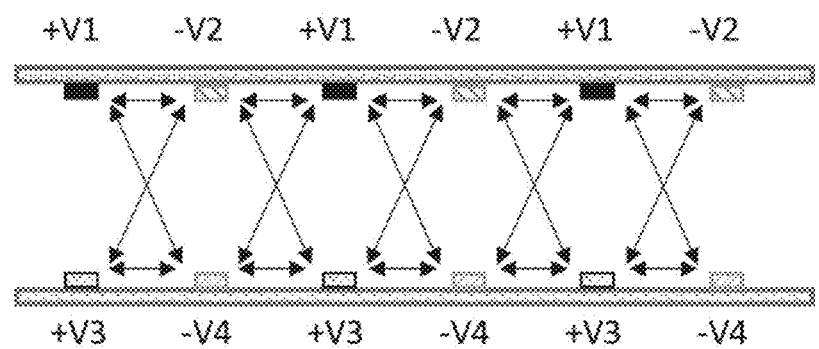

FIG. 13 shows an example of driving the light modulator to decrease transparency. Note that diagonal field lines are created to increase the speed of dispersion of the particles. Moreover, particles disperse more towards the middle of the light modulator which decreases the curtain effect.

Figure 14:
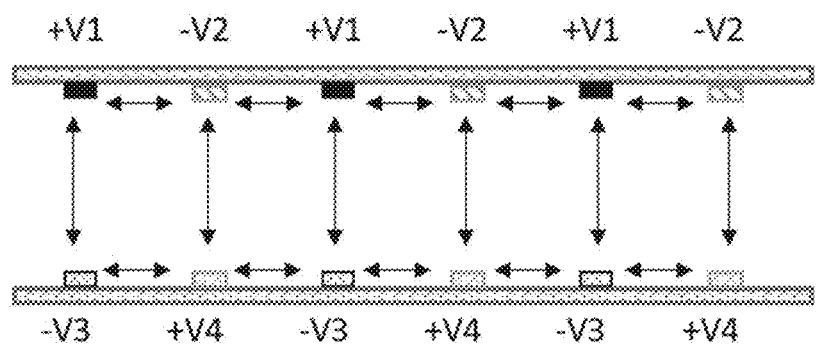

FIGS. 13 and 14 show two different ways of driving towards to a darker state. FIG. 14 shows an example of driving the light modulator where both vertical and lateral electric field are enhanced. Which one of the vertical and lateral electric fields are stronger to drive pigments will depend on the dimensions of the design, e.g., cell gap and line gap. The electric field will be stronger if the distance between electrode is reduced and the particles will move towards the electric field region where the electric field is strongest. If the difference in electric field between vertical and lateral fields in this case is not strong enough, then the light modulator will demonstrate an intermediate open state in the case the design is homogeneous over the substrate.

In the case the design varies in the light modulator and the distance between electrodes within same substrates and between substrates is not constant over the light modulator, then the highest electric field region, where locally the charged particles aggregate along, varies which results in optical differences. In some areas, the light modulator may become more transparent while in other areas, the light modulator may become less transparent even for a uniform electrical drive. This effect is less achievable by other driving methods, e.g., as shown in FIG. 13. This effect may be used, for example, to embed logos in the light modulator.

Figure 15:
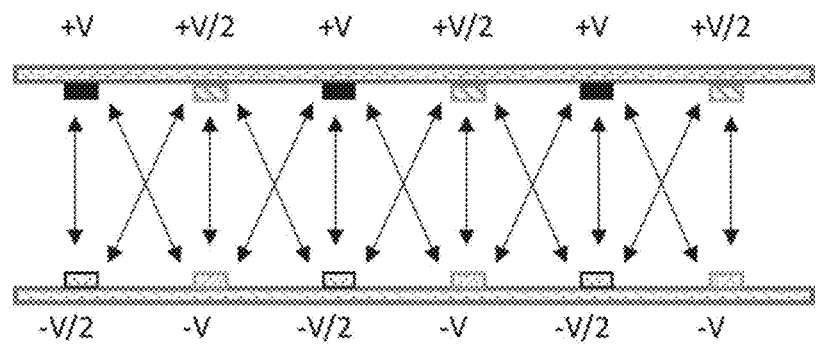

FIG. 15 schematically shows an example of using an alternating current of one of multiple maximum amplitudes. A first electrode on the top substrate is driven with a reference voltage +V, while a second electrode on the top substrate is driven with a reference voltage +V/2. The opposite electrodes on the bottom electrodes are driven with −V/2 and −V respectively. Note that the voltage difference between opposite electrodes is +/−1.5 V, while the voltage difference between neighboring electrodes is +/−0.5 V. As a result the particles will mostly react to the vertical field, and arrange themselves to increase transparency, however, the effect will be smaller.

Figure 16:
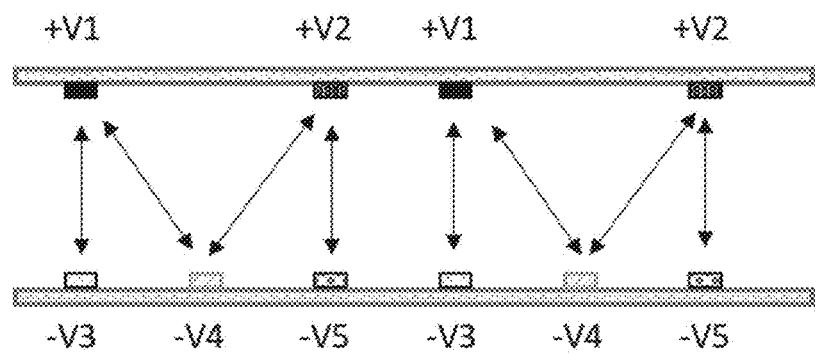
Figure 17:
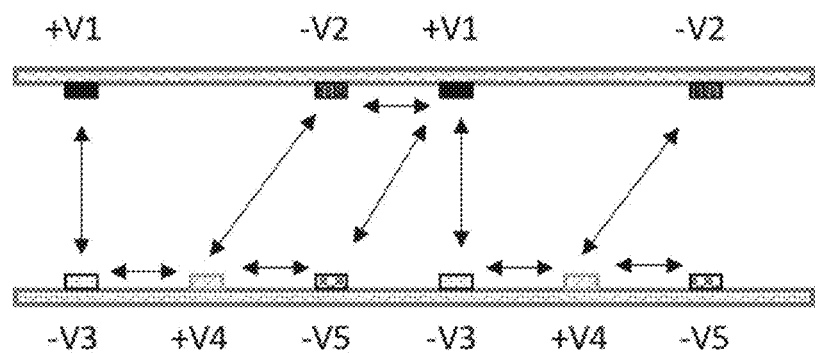

FIGS. 16 and 17 schematically show examples of embodiments wherein one substrate has 2 electrodes and the other has 3 electrodes. In an embodiment, at least three electrodes are applied to at least one of the first substrate and the second substrate, and at least two electrodes to the other substrate.

Additional combinations of voltages can be obtained when an additional electrode is available. This provides more control over grey scaling, for example. For example, with 5 electrodes instead of 4, addressing mode are possible that are not feasible in a four electrodes system.

Having at least three electrodes on a substrate, allows to reduce the curtain effect; e.g., the visual appearance of a curtain closing between the electrodes, instead of a homogenous gradual increase of decrease in transparency. For example, one or more or all of the additional electrode(s) on one of the substrates can be used for closing (decreasing transparency) even if it is not used for opening (increasing transparency). The curtain effect is visibly distracting in itself, but also increases diffraction.

An advantage of having at least 3-electrodes on a substrate is that they can be closer together without decreasing maximum transparency or reflectivity. For example, in an embodiment, electrodes on a substrate with at least 3 electrodes may be space 35 micron apart, while the electrodes on the opposite substrate with, say, 2 electrodes may be spaced 70 micron apart. These are exemplifying numbers; requirements of an application may change the actual numbers.

The electrodes that are spaced closer together, provide a stronger electric field, so faster closing is obtained, so the curtain effect is reduced. On the other hand, when open, there is little loss of maximum transparency or reflectivity if the additional electrode is configured not to attract particles.

In an embodiment, the additional electrode may be made from a different material than the other electrodes, e.g., a transparent material. For example, four electrodes may be made of copper while an additional fifth electrode is made of ITO.

FIGS. 16 and 17 show examples wherein a distance between subsequent main-lines of the multiple electrodes in the first substrate is larger than a distance between subsequent main-lines of the multiple electrodes in the second substrate. For example, the distance may be twice as much, as is shown. For example, the distance may be at least 2 times as much, 1.5 times as much, or 1.2 times as much, etc.

FIGS. 16 and 17 show examples of driving to decrease transparency.

Figure 18:
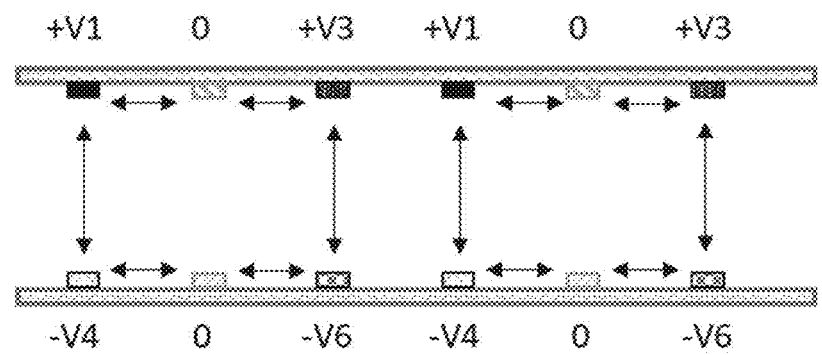
Figure 19:
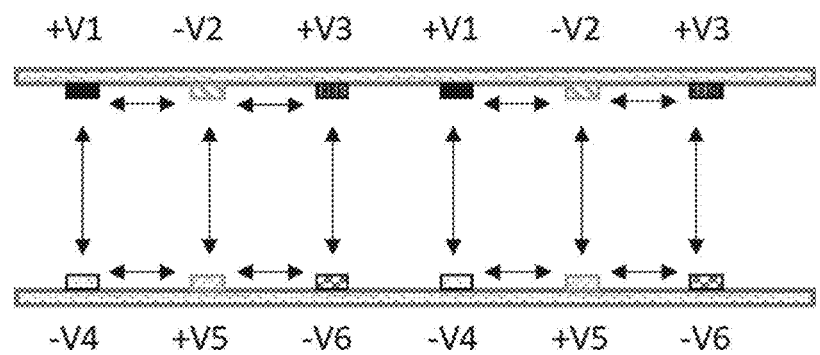

FIGS. 18-19 schematically show examples of embodiments of a light modulator having three electrodes on each substrate.

Having at least three electrodes on each side increases the advantages of having five electrodes. Closer electrodes are now possible on both sides without decreasing transparency, since not all electrodes are needed for opening the device. Furthermore, 6 electrodes can be arranged symmetrically with 3 electrodes on each substrate.

Figure 20:
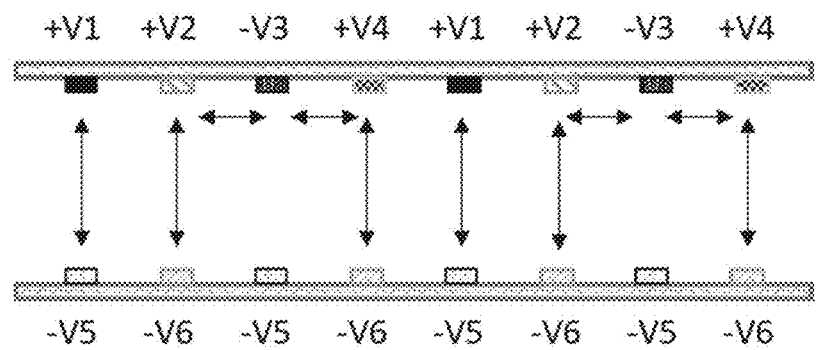
Figure 21:
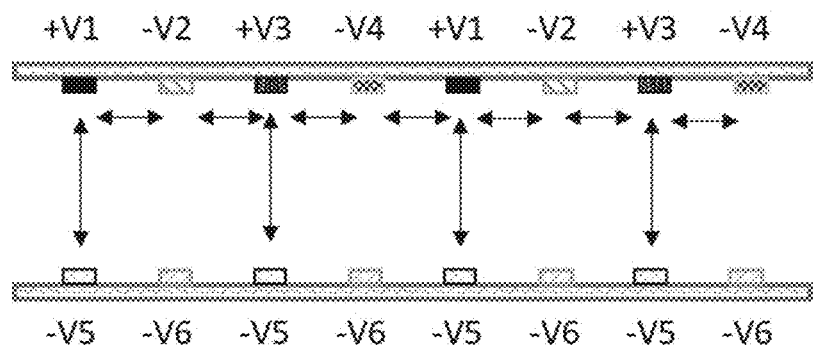
Figure 22:
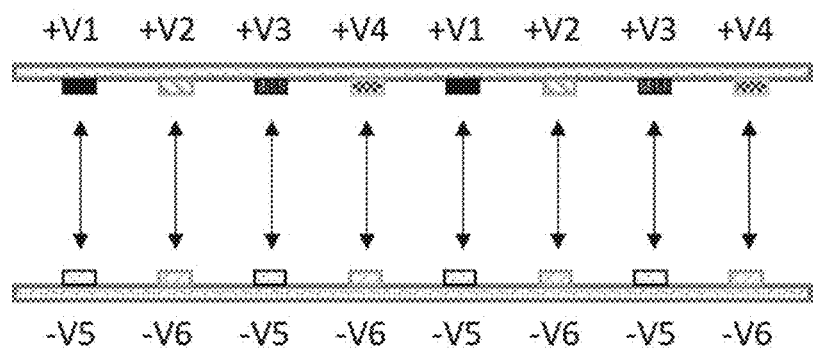
Figure 23:
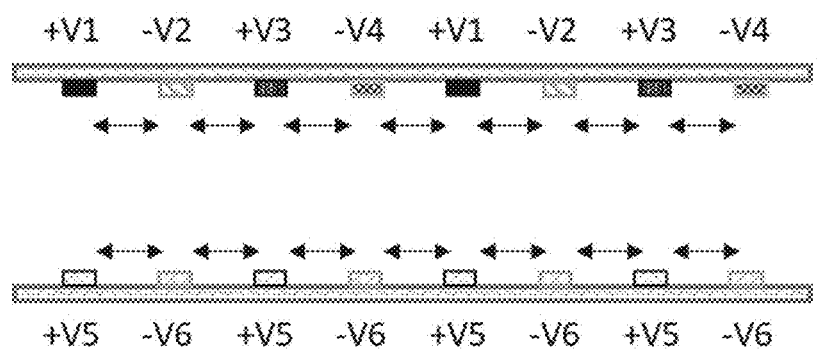
Figure 24:
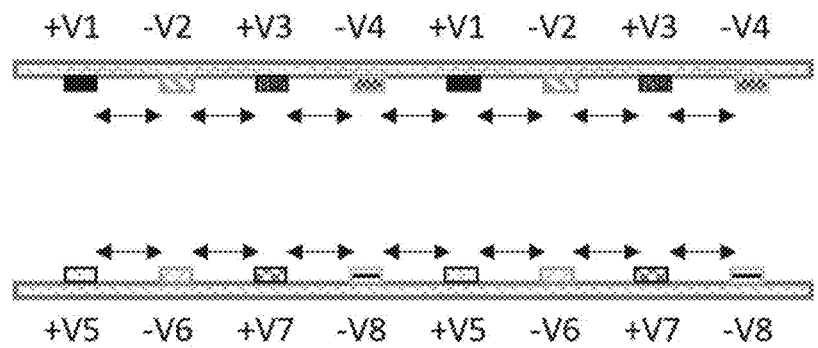
Figure 25:
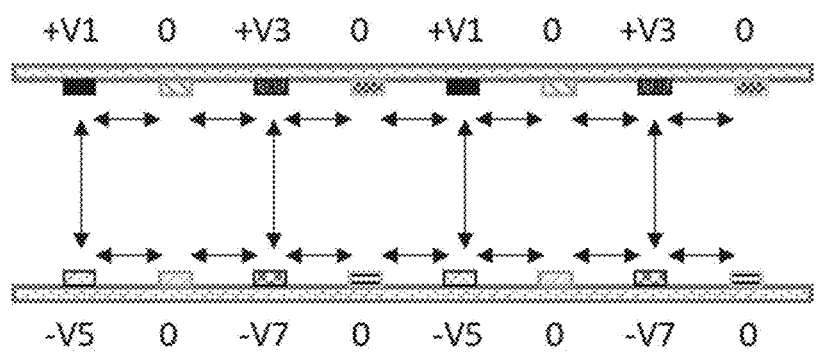
Figure 26:
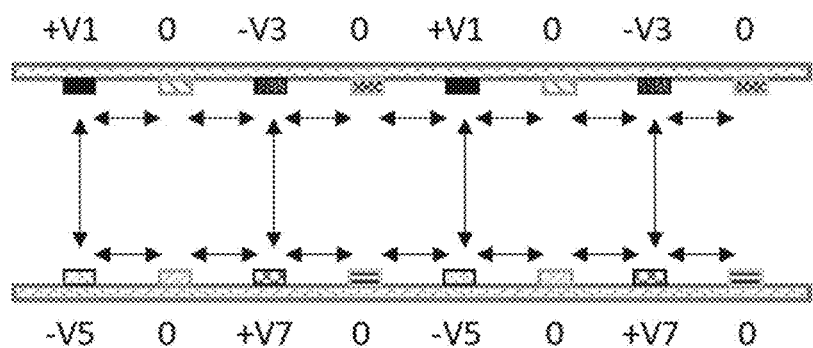
Figure 27:
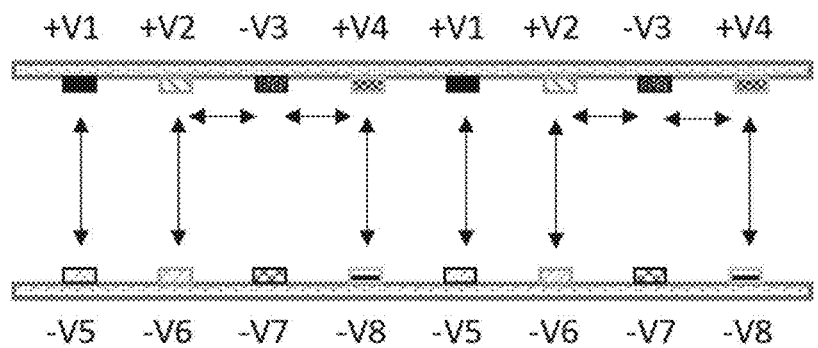
Figure 28:
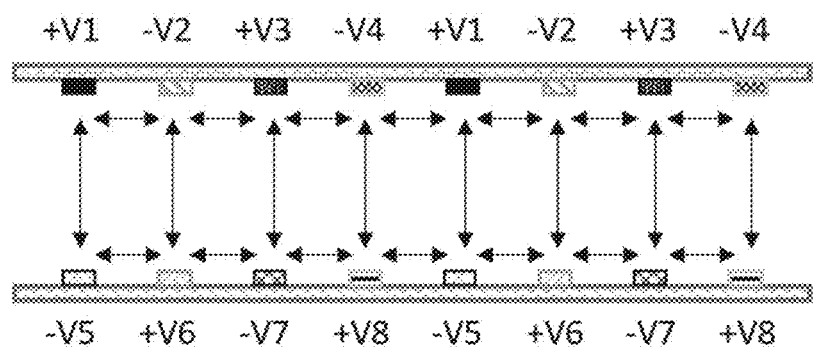
Figure 29:
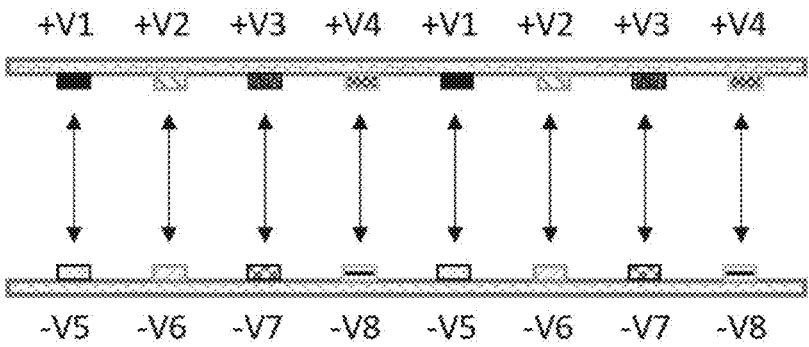

FIGS. 20-23 schematically show examples of embodiments of a light modulator having four electrodes on one substrate and two electrodes on the other substrate. With a higher number of electrodes, further modulation of transparency is possible and controlled by design rather than only by particle motion. As illustrated in FIG. 20, optical modulator areas can be set to spread particles in the visible area while other parts can be set to aggregate particles within the vertical field. This enables design control grey scaling. FIGS. 21, 22 and 23 are showing other examples of potential associations over the 2 and 4 electrodes to modulate grey scaling.

FIGS. 24-29 schematically show examples of embodiments of a light modulator having four electrodes on each substrate. These examples allow even further control over the grey scale.

Figure 30:
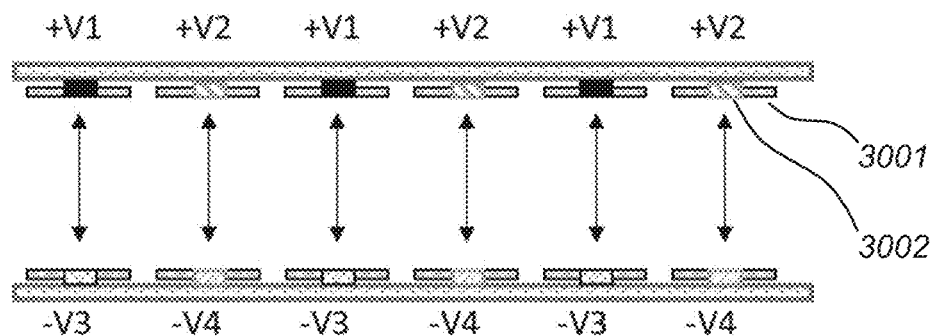

FIG. 30 schematically shows an example of an embodiment of a light modulator. The light modulator in FIG. 30 has two electrodes on each side, but could be implemented with more than 2 electrodes.

The light modulator shown in FIG. 30 has a further secondary electrode running parallel to a primary electrode. For example, the primary electrode may be a main line or a branch, etc. In FIG. 30, one primary electrode has been indicated with reference numeral 3001, and one secondary electrode has been marked with reference numeral 3002. As shown, a secondary electrode runs along each of the primary electrodes, but this is not necessary.

In an embodiment, the secondary electrode is connected to the primary electrode through a semiconductor layer, the secondary electrode being electrically connected with the primary electrode line by a semiconductor layer which enables transmission current only above a threshold voltage on the primary electrode. Thus a voltage switch can be addressed by a potential.

Accordingly, the primary electrodes or part of them can be locally interconnected to a secondary electrode. By interfacing a semiconductor material layer, the transparent electrode will only see a potential if a minimum potential is applied on the electrode. This can create a voltage switch on the surface to be addressed by a potential. The secondary electrode may be transparent. The second electrode may be of a same or similar size as the primary electrode, or even larger.

In an embodiment, the secondary electrode comprises a capacitor arranged to hold a charge locally. This can be used for a gain in power. To arrange the extended electrode as a capacitor no semiconductor layer is needed.

In an embodiment, the secondary electrode comprises a photo-voltaic semiconductor material, the secondary electrode providing power to the primary electrode line.

Figure 31:
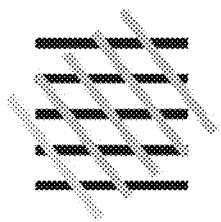
Figure 32:
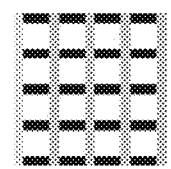
Figure 33:
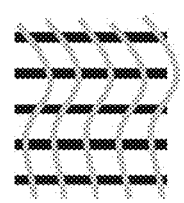

FIGS. 31-33 schematically show examples of an embodiments of a substrate having two electrodes extending in two dimensions but which are offset in a third dimension. The figures show a top view. Two electrodes are each arranged in a plane but the planes are offset with respect to each other. For example, the electrodes may be etched.

The interdigitated pattern of electrodes on each substrate enables setting the light modulator to a particle dispersed state (typically going to dark state). The electric field parallel to the substrate will provide a high level of homogeneity. The distribution of electrical field along the vertical axis, i.e., the axis going from substrate to substrate, promotes concentration of particles trough the field lines can be considered less homogeneous and may take advantage of that physical non homogeneity to create grey scales more easily.

The offset between electrodes on the same substrate allows an angle between the interdigitated main-lines, to reduce diffraction level. Complementary lines can be created to further reduce the diffraction issue, and/or to reduce parallax. In an embodiment, a passive matrix design is used.

Offsetting two electrode patterns with an angle, may be applied within a substrate versus the opposing substrates, but may also be applied between the patterns on different substrates. For example, the electrode patterns on different substrates may be offset with an angle. For example, in an embodiment two or more interdigitated electrodes may be applied to two parallel substrates, where the main-lines in the two substrates are not parallel, but make an angle with respect to each other.

Figure 34:
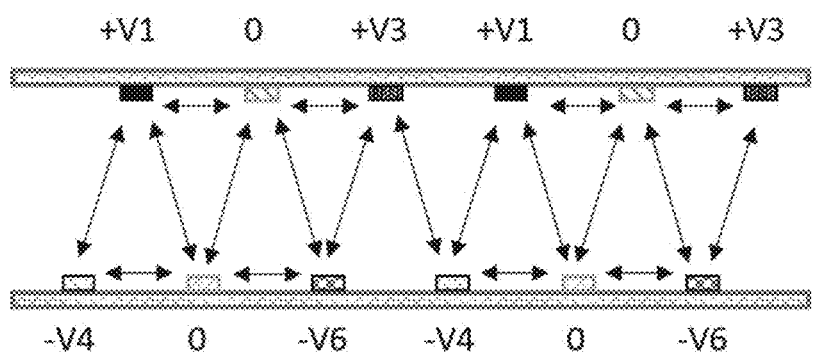

FIG. 34 schematically shows an example of an embodiment of a light modulator an electrode on the first substrate is arranged at least in part in the same pattern as a second electrode on the second substrate, wherein the pattern of the first electrode and second electrode are shifted with respect to each other.

In the example, misalignment based on a 6 electrodes system is shown. Mis-alignment decrease parallax effect due to production alignment tolerance errors. One particular way to drive the system is shown in the figure.

Specific misalignment can be applied globally to the device or only locally. For example, specific misalignment can be operated on edges to prevent unwanted particle motion towards the edges, also known as the pigment migration effect. In an embodiment, alignment in specific locations can be modified to better comply for future bending of the light modulator. Combining the misaligned and aligned patterns between the substrates can improve optical effects such as diffraction and/or parallax.

For example, in an embodiment two or more interdigitated electrodes may be applied to two parallel substrates, where the main-lines in the two substrates are parallel, but are shifted with respect to each other.

Figure 35:
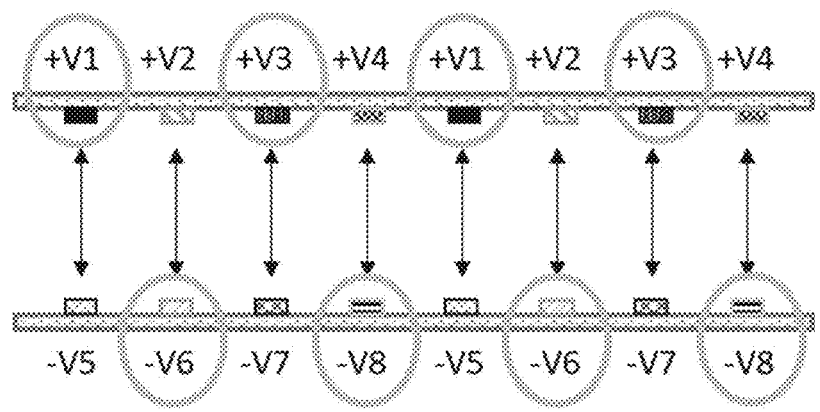

FIG. 35 schematically shows an example of an embodiment of a light modulator having four electrodes on each substrate. In an embodiment, different material may be combined for the electrodes to reduce parallax.

For example, on each substrate, 1 electrode out of 2 can be made metallic or transparent (ITO, for example), or with different optical indexes. The electrode on the opposite substrate will be made of the other type of material; for example, a transparent material may be opposite a non-transparent material.

For example, in the 8 electrodes system shown in FIG. 35, the circled electrodes may be made transparent (e.g., ITO) and the other electrodes may be metallic (e.g., copper) and non-transparent. This decreases the impact of alignment tolerance on parallax even if the horizontal electrode shape design needs to fully align between bottom and top substrates. Manufacture variation also has less of an impact.

Figure 36:
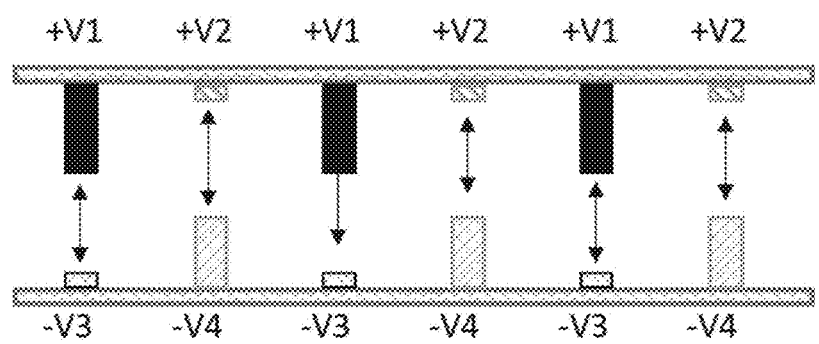
Figure 37:
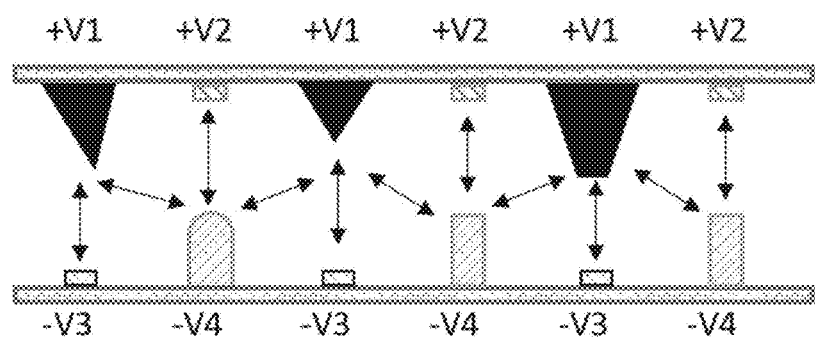

FIGS. 36-37 schematically show examples of embodiments of a light modulator having different geometries across the substrate. For example, an electrode geometry may differ across at least one of the first and second substrate, e.g., one or more of electrode thickness, width, shape, area and volume.

Using different electrode geometries may be combined with any kind of electrode construction.

In an embodiment, electrodes do not have the same electrode height. Modifying the electrode height will influence both the electric field distribution and the liquid flow. Similarly, electrode shapes parallel to the substrates can be from any form. Electrode shape in the perpendicular plane compared to the substrates can be also shaped differently and can be as example rectangular with and without rounded corners, triangle, trapezoidal, etc.

FIG. 36 shows an example of electrodes on a substrate having different height. FIG. 36 also shows an example of opposite electrodes on different substrates having different heights.

FIG. 37 shows an example of electrodes on a substrate having different shapes. FIG. 37 also shows an example of opposite electrodes on different substrates having different shapes.

An advantage of more height in an electrode is that it is less susceptible to corrosion.

Figure 38:
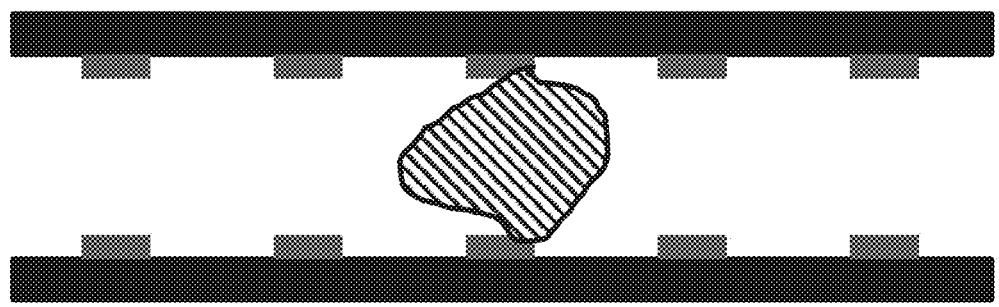
Figure 39:
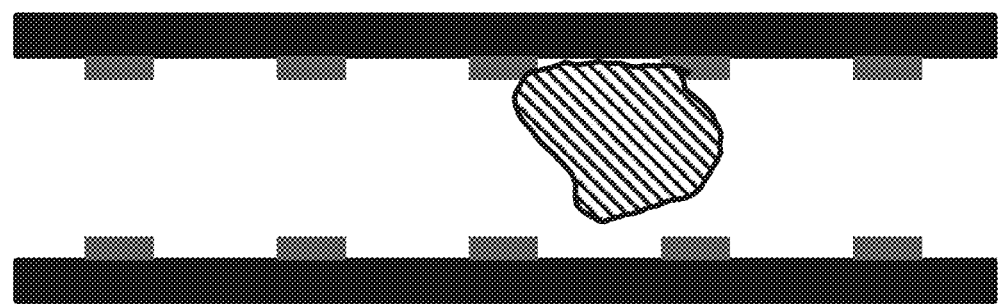

FIGS. 38-39 schematically show examples of a physical contaminant causing an electrical short between electrodes in a prior art light modulator.

FIG. 38 schematically shows an example of a physical contaminant causing an electrical short between electrodes on opposing substrates in a prior art light modulator.

FIG. 39 schematically shows an example of a physical contaminant causing an electrical between adjacent electrodes on a single substrate in a prior art light modulator.

FIGS. 40-44 schematically show examples of embodiments of a light modulator.

FIGS. 38-39 schematically show examples of a physical contaminant causing an electrical short between electrodes in a prior art light modulator.

FIG. 38 schematically shows an example of a physical contaminant capable of causing an electrical short between electrodes on opposite substrates in a prior art light modulator.

FIG. 39 schematically shows an example of a physical contaminant capable of causing an electrical between adjacent electrodes on a single substrate in a prior art light modulator.

FIGS. 40-45 schematically show examples of embodiments of a light modulator, wherein various configurations of the protective coating are schematically represented, further demonstrating how these may prevent the formation of short-circuits between electrodes by a physical contaminant (not part of the embodiments).

Figure 40:
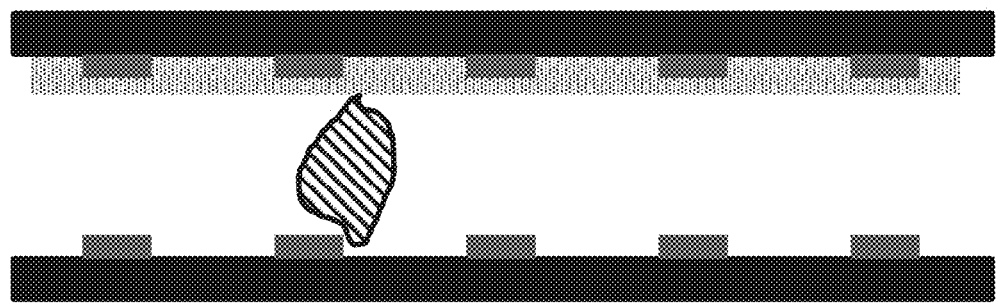

FIG. 40 shows an example of electrodes on a substrate being provided with a protective coating covering the entire substrate, such that both the electrodes and the substrate parts not covered with electrodes are covered with the protective coating. FIG. 40 also shows an example of opposite electrodes on a different substrate not being provided with a protective coating.

Figure 41:
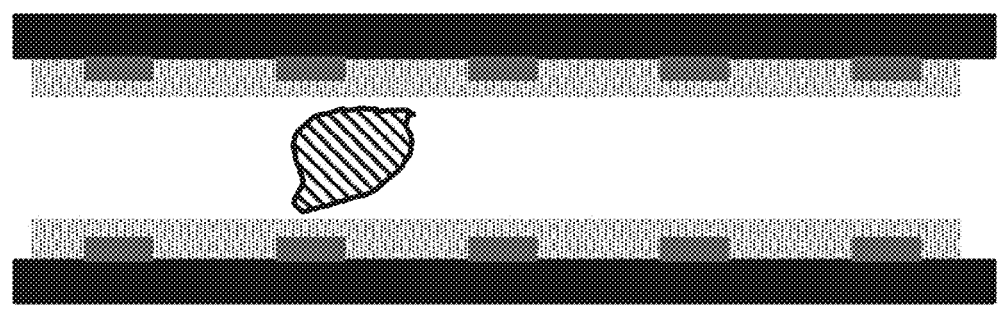

FIG. 41 shows an example of electrodes on both substrates being provided with a protective coating covering the entire substrate, such that both the electrodes and the substrate parts not covered with electrodes (and in fluid contact with the fluid) are covered with the protective coating.

Figure 42:
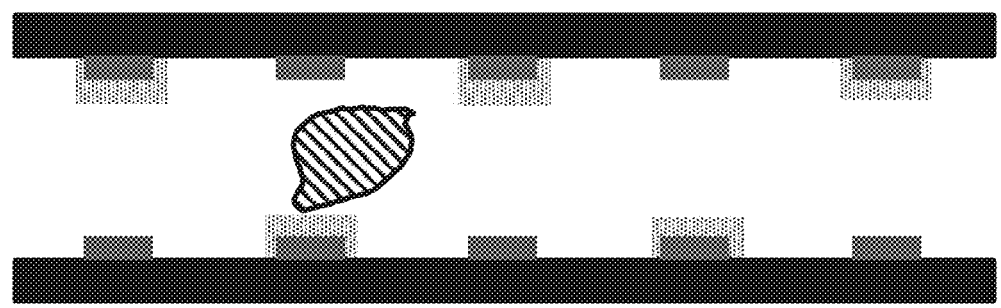

FIG. 42 shows an example of electrodes being provided with a protective coating in a regular pattern or a random pattern, wherein not necessarily all electrodes are covered. In the example a part of the electrodes on both the first and the second substrate is covered with the protective coating.

Figure 43:
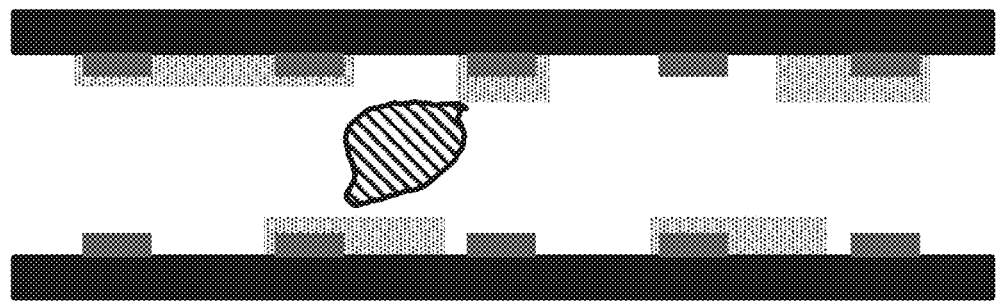

FIG. 43 shows an example of electrodes being provided with a protective coating in a regular pattern or a random pattern, wherein not necessarily all electrodes are covered with the protective coating. In the example the protective coating is provided such that both some of the electrodes are covered with the protective coating, but not all, as well as a part of the surface, but not all, of the inner side of the substrate where no electrodes are provided. In the example the protective coating is provided on a part of the electrodes and part of the inner side of the substrate of both substrates.

Figure 44:
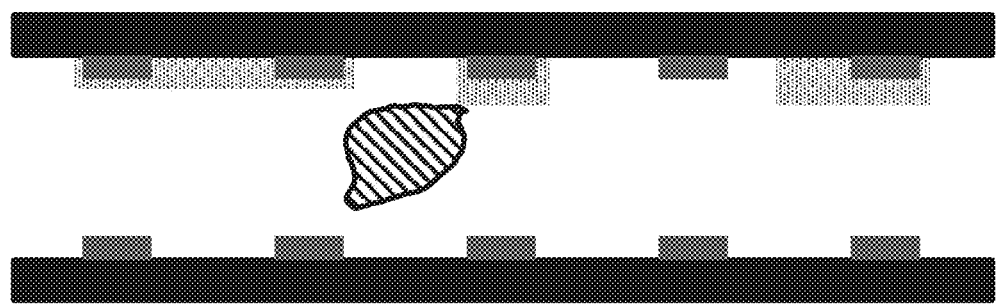

FIG. 44 shows an example of electrodes being provided with a protective coating in a regular pattern or a random pattern, wherein not necessarily all electrodes are covered with the protective coating. In the example the protective coating is provided such that both some of the electrodes are covered with the protective coating, but not all, as well as a part of the surface, but not all, of the inner side of the substrate where no electrodes are provided. In the example the protective coating is provided on a part of the electrodes and on a part of the inner side of the substrate of only one substrate, whereas no protective coating is provided on the opposite substrate.

Figure 45:
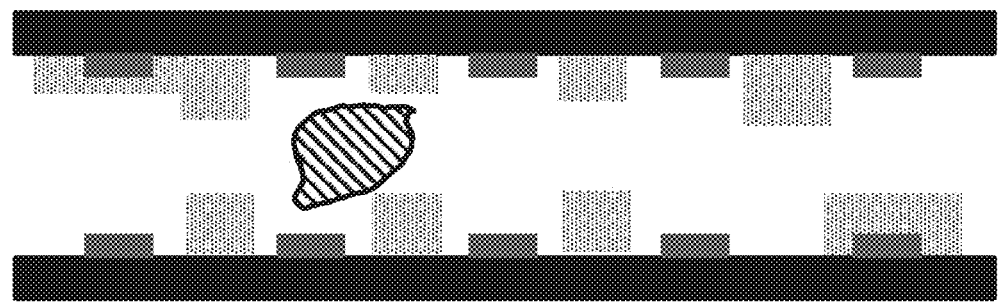

FIG. 45 shows an example of electrodes being provided with a protective coating in a regular pattern or a random pattern, wherein not necessarily all electrodes are covered with the protective coating. In the example the protective coating is provided such that both some of the electrodes are covered with the protective coating, but not all, as well as a part of the surface, but not all, of the inner side of the substrate where no electrodes are provided. In the example the protective coating is provided on a part of the electrodes and on a part of the inner side of the substrate of both substrates. FIG. 45 also shows that some parts of the protective coating may have a different thickness compared to other parts of the coating.

Figure 46:
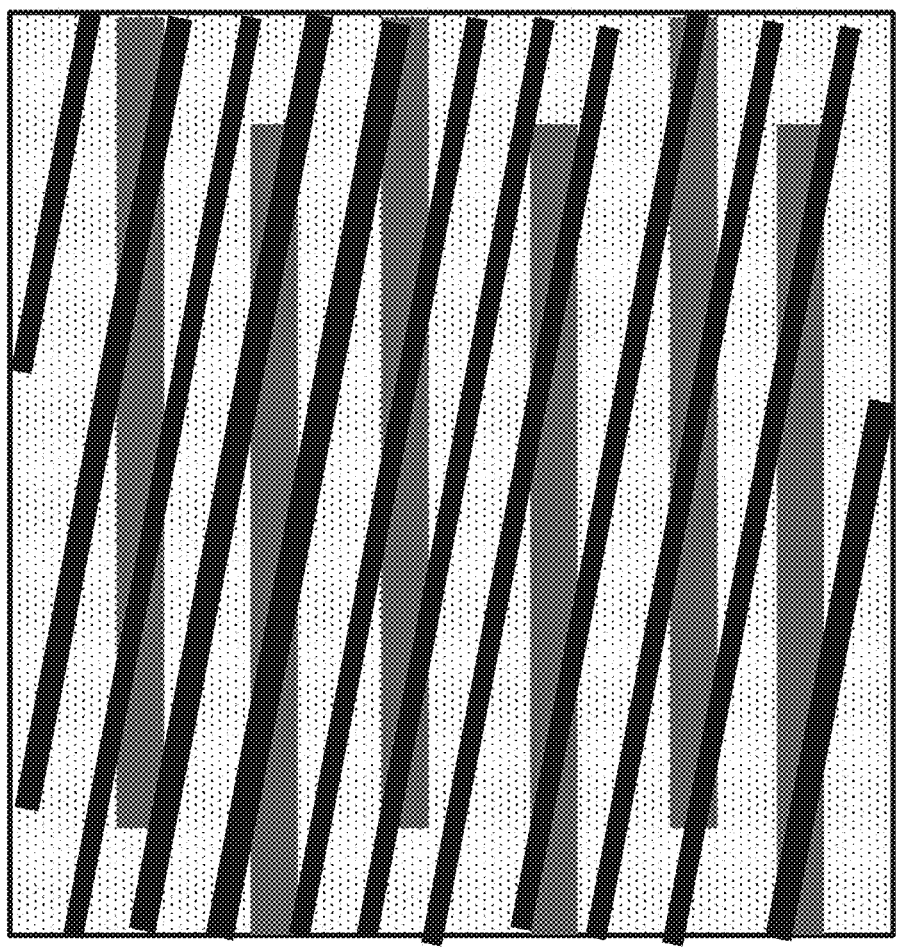
FIGS. 46-48 schematically show examples of embodiments of substrates for use in a light modulator.
Figure 47:
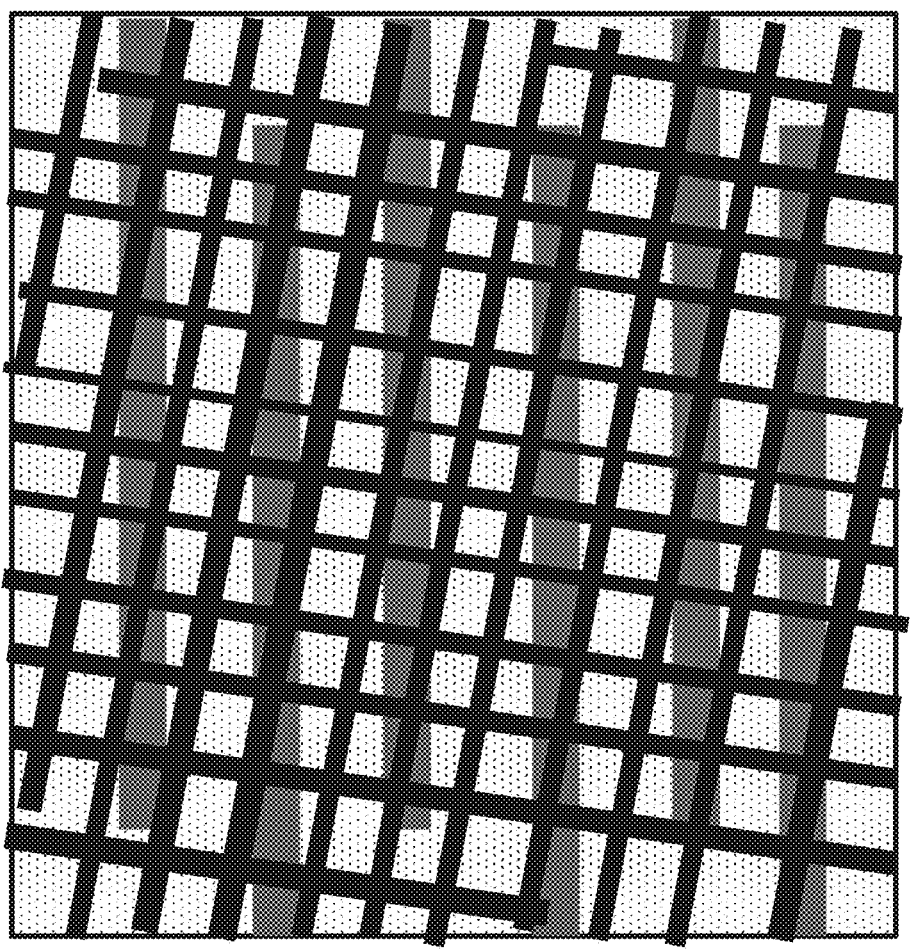
Figure 48:
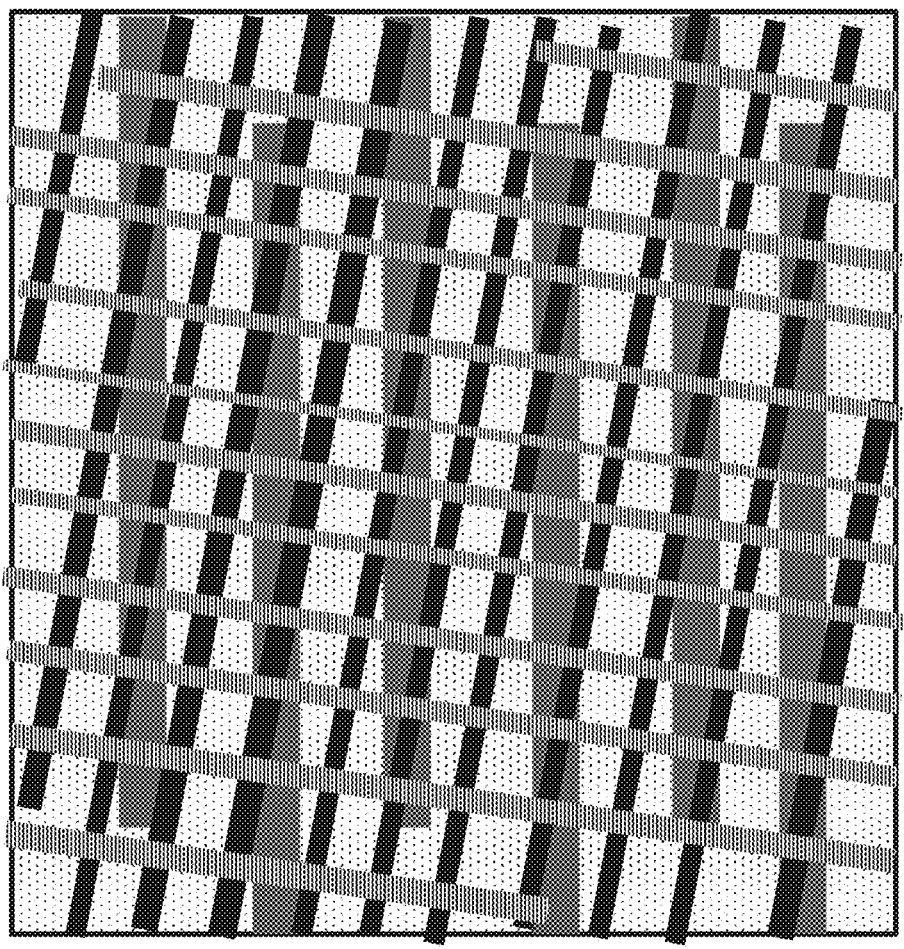

FIGS. 46-48 schematically show examples of embodiments of substrates for use in a light modulator having different geometries of protective coating across the electrode and the rest of the substrate. For example, a protective coating geometry may differ across at least one of the first and second substrate, e.g., one or more of shape (lines, mesh, gauze), coating width, coating length, coating thickness, absence or presence of protective coating on opposite substrate, and alignment with respect to coating on opposite substrate.

FIG. 46 shows an example of a top view of a single substrate (dotted) to which electrodes (grey lines) are applied, wherein a protective coating (black lines) is applied on the surface of the electrodes and the substrate not provided with electrodes. In this example, the protective coating is applied in a pattern of parallel strips that form an angle with the main lines of the electrodes.

FIG. 47 shows an example of a top view of a single substrate (dotted) to which electrodes (grey lines) are applied, wherein a protective coating (black lines) is applied on the surface of the electrodes and the substrate not provided with electrodes. In this example, the protective coating is applied in a mesh-shaped pattern of which the main lines are shifted with respect to the main lines of the electrodes.

FIG. 48 shows an example of a top view of a bottom substrate (dotted) to which electrodes (grey lines) are applied, wherein a protective coating (black lines) is applied on the surface of the electrodes and the substrate not provided with electrodes. Also shown in this example is the protective coating (black lines) provided on the surface of the electrodes applied on a top substrate (not shown) and the surface of the substrate not provided with electrodes of this top substrate. In this example, the protective coatings in the form of parallel lines applied on the top and the bottom substrate together form a mesh-shaped pattern of which the main lines are tilted with respect to the main lines of the electrodes.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A light modulator comprising:
   a first substrate and a second substrate, the first and second substrates being arranged with inner sides opposite to each other,
   multiple electrodes being applied to the inner side of each of the first and second substrates, each of the first and second substrates having an inner surface area,
      wherein each of the multiple electrodes is arranged in a pattern across the substrate, the multiple electrodes each comprising a multiple of main-lines extending across the substrate in a first direction, the multiple of main-lines of the multiple electrodes being arranged alternatingly with respect to each other on the substrate, and
      wherein at least a part of the inner surface area of at least one of the first substrate and the second substrate is provided with a protective coating to protect the electrodes;
   an optical layer between the first and second substrates, the optical layer comprising a fluid comprising particles, wherein the particles are electrically charged or chargeable;
   a controller configured to apply an electric potential to the multiple electrodes to obtain an electro-magnetic field between the multiple electrodes providing electrophoretic movement of the particles towards or from one of the multiple electrodes causing modulation of the optical properties of the light modulator, wherein the multiple electrodes of at least one of each substrate comprise at least a first electrode and a second electrode, the first electrode and the second electrode each comprising:
   a multiple of main-lines extending across the substrate in a first direction, the multiple of main-lines of the first and second electrode being arranged alternatingly with respect to each other on the substrate;
   multiple branches extending from the main-lines into the areas between the main-lines, the branches that extend into an area between a first main-line and a second main-line of the first electrode and of the second electrode extending alternatingly from the first and second main-line, at least one of two subsequent branches that extend into the same area extending at least half across the area, measured along a second direction orthogonal to the first direction, wherein two subsequent branches that extend into the same area between a first main-line and a second main-line overlap in the second direction when projected in the first direction.

2. A light modulator as in claim 1, wherein the protective coating is provided to at least a part of the inner surface area of one of the first substrate and the second substrate, and wherein no protective coating is provided to the inner surface of the opposite substrate.

3. A light modulator as in claim 1, wherein the protective coating is provided to at least a part of the inner surface area of both the first substrate and the second substrate.

4. A light modulator according as in claim 1, wherein the protective coating covers at least 1% of the total inner surface area of at least one of the first and second substrate.

5. A light modulator as in claim 3, wherein the protective coating covers at least 1% of the total inner surface area of both the first substrate and the second substrate.

6. A light modulator as in claim 1, wherein the inner side of one of the first and second substrates is fully provided with the protective coating such that substantially the entire surface of the multiple electrodes applied on the inner side, and substantially the inner side of the substrate not provided with electrodes is covered with the protective coating, and wherein the opposite substrate is not provided with the protective coating.

7. A light modulator as in claim 1, wherein the inner sides of both the first and the second substrate are fully provided with the protective coating such that substantially the entire surface of the multiple electrodes applied on the inner side, and the inner side of the substrate not provided with electrodes are covered with the protective coating.

8. A light modulator as in claim 1, wherein the protective coating is provided as a patterned coating.

9. A light modulator as in claim 1, wherein the protective coating is provided as a patterned coating, and wherein a first main line on the first substrate is provided with the protective coating, and a second main line on the second substrate opposite the first main line is not provided with the protective coating, the second main line being in fluidic contact with the fluid, or vice versa.

10. A light modulator as in claim 9, wherein the multiple main lines on the first and the second substrate are alternatingly provided and not provided with the protective coating.

11. A light modulator as in claim 9, wherein the patterned coating is provided to at least a part of the electrodes and optionally the inner side of one of the first substrate and the second substrate, but not to the opposite substrate.

12. A light modulator as in claim 1, wherein the protective coating is provided as a patterned coating, and wherein the coating is provided to the inner side of at least one of the first and second substrates in a random pattern, such that at least a part of the multiple electrodes applied on the inner side and/or the inner side of the substrate not provided with electrodes is provided with the coating, and at least a part of the multiple electrodes applied on the inner side and the inner side of the substrate not provided with electrodes is not provided with the coating.

13. A light modulator as in claim 1, wherein the protective coating is a transparent or a semi-transparent coating.

14. A light modulator as in claim 1, wherein the protective coating is a reflective coating.

15. A light modulator as in claim 1, wherein the protective coating provides an additional optical function to the modulator.

16. A light modulator as in claim 1, wherein the protective coating has a thickness in the range of 1 nm to 100 μm, preferably in the range of 10 nm to 50 μm, preferably in the range of 100 nm to 10 μm.

17. A light modulator as in claim 1, wherein
at least three electrodes are applied to at least one of the first substrate and the second substrate, or
at least three electrodes are applied to both the first substrate and the second substrate.

18. A light modulator as in claim 1, wherein a distance between subsequent main-lines of the multiple electrodes in the first substrate is larger than a distance between subsequent main-lines of the multiple electrodes in the second substrate.

19. A light modulator as in claim 1, having a transparent state and a non-transparent state, or having a reflective state and a non-reflective state, the light modulator being configured to switch to the non-transparent state or to the non-reflective state by creating an alternating voltage on at least one of the first and second substrates, applying an alternating current between at least a first electrode and a second electrode on the first substrate and/or between a first electrode and a second electrode on the second substrate, switch to the transparent state or to the reflective state by creating an alternating voltage between the first and second substrate, applying an alternating current between a first electrode on the first substrate and a first electrode on the second substrate, and/or between a second electrode on the first substrate and a second electrode on the second substrate.

20. A light modulator as in claim 1, wherein two subsequent branches that extend into the same area between a first main-line and a second main-line have a different length, the longer branch being at least 5% longer than the shorter branch.

21. A light modulator as in claim 1, wherein distances between a main-line and a subsequent main-line on the substrate of the first electrode and the second electrode vary in the second direction and/or in the first direction.

22. A light modulator as in claim 21, wherein the distances between main-lines
alternate between increasing towards a maximum distance and decreasing towards a minimum distance, and/or
increase or decrease with a random amount within the maximum distance and the minimum distance, and/or
wherein a sequence of distances in the second direction between main-lines across the substrate varies randomly, wherein the sum of distances is between a minimum and maximum total distance.

23. A light modulator as in claim 1, wherein a main line and the branches extending therefrom are built up as a connected series of sub main-lines from which branches extend, the sub main-lines in the series connecting to form the main-line, wherein
branches extending on a same side of the sub main-line are of equal length, and/or
branches extending on a same side of the sub main-line are parallel, and/or
a number of branches extending from either side of the sub main-line are equal.

24. A light modulator as in claim 23, wherein branches extending on a same side of the sub main-line and branches extending from a subsequent sub main-line of the same main-line
have a different length, and/or
make a different angle with the first direction, and/or
have a different number of branches extending from the side of the sub main-line.

25. A light modulator as in claim 23, wherein an angle between a branch and the first direction in a sub main-line is randomly selected between 45 and 90 degrees.

26. A light modulator as in claim 23, wherein a sub main-line and a subsequent connected sub mainline in the same main-line are shifted with respect to each other in both the first direction and in the second direction.

27. A light modulator as in claim 1, wherein the pattern in which the first and second electrodes are arranged is subdivided into a set of blocks extending across the substrate in the first and second direction, each block comprising multiple sub-lines of a part of the multiple main-lines of the first electrode and multiple sub-lines of a part of the multiple main-lines of the second electrode, wherein at least one of the blocks is repeated multiple times on the substrate.

28. A light modulator as in claim 27, wherein
in part of the blocks the sub main-lines electrodes comprise multiple-branches and in part of the blocks the electrodes do not comprise multiple-branches, and/or
in part of the blocks the sub main-lines are straight, and in part of the blocks the sub main-lines are wavy.

29. A light modulator as in claim 1, wherein the pattern in which the electrodes are arranged is subdivided into multiple parts, at least one of: an electrode line gap, electrode line thickness, electrode line width, electrode material, electrode line shapes, and electrode line directions, being different in the multiple parts causing optical effects.

30. A light modulator as in claim 1, wherein an electrode geometry selected from the group consisting of: thickness, width, shape, area and volume differs across at least one of the first and second substrate.

31. A light modulator as in claim 1, wherein a primary electrode is connected at least in part to a further secondary electrode running parallel to the primary electrode, wherein
the secondary electrode is connected to the primary electrode through a semiconductor layer, the secondary electrode being electrically connected with the primary electrode line by a semiconductor layer which enables transmission current only above a threshold voltage on the primary electrode, and/or
the secondary electrode is transparent, and/or
the secondary electrode comprises a capacitor arranged to hold a charge locally, and/or
the secondary electrode comprises a photo-voltaic semiconductor material, the secondary electrode providing power to the primary electrode line.

32. A light modulator as in claim 1, wherein the multiple electrodes extend across the substrate in two dimensions, at least a first electrode of the multiple electrodes being set apart from at least a second electrode of the multiple electrodes in a third dimension.

33. A light modulator as in claim 1, wherein an electrode on the first substrate is arranged at least in part in the same pattern as a second electrode on the second substrate, wherein the pattern of the first electrode and second electrode are shifted with respect to each other.

* * * * *